US008167704B2

(12) United States Patent
Yoshizawa

(10) Patent No.: US 8,167,704 B2
(45) Date of Patent: May 1, 2012

(54) SLOT MACHINE AND ASSOCIATED METHODOLOGY OF LINKING SYMBOLS TO PROVIDE A VARIABLE DISPLAY FUNCTION HAVING FEATURE IN LINKING DISPLAY CONTENTS OF SYMBOLS WITH ONE ANOTHER AND VARIABLE DISPLAY OPERATIONS OF SYMBOLS WITH ONE ANOTHER

(75) Inventor: Kazumasa Yoshizawa, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 420 days.

(21) Appl. No.: 12/417,697

(22) Filed: Apr. 3, 2009

(65) Prior Publication Data

US 2009/0253488 A1 Oct. 8, 2009

Related U.S. Application Data

(60) Provisional application No. 61/042,147, filed on Apr. 3, 2008.

(51) Int. Cl.
*A63F 9/24* (2006.01)
*G06F 17/00* (2006.01)

(52) U.S. Cl. ........................................................ 463/20

(58) Field of Classification Search ..................... 463/20
See application file for complete search history.

(56) References Cited

U.S. PATENT DOCUMENTS 6,012,983 A 1/2000 Walker et al.
6,547,242 B1 * 4/2003 Sugiyama et al. ........ 273/142 R
6,960,133 B1 11/2005 Marks et al.
2007/0060296 A1 3/2007 Yoshizawa
2008/0076518 A1 3/2008 Yoshizawa
2008/0146314 A1 6/2008 Yoshizawa
2008/0146319 A1 6/2008 Yoshizawa
2008/0287178 A1 * 11/2008 Berman et al. .................. 463/20

OTHER PUBLICATIONS

U.S. Appl. No. 12/408,245, filed Mar. 20, 2009, Yoshizawa.

* cited by examiner

*Primary Examiner* — William D Coleman
(74) *Attorney, Agent, or Firm* — Oblon, Spivak, McClelland, Maier & Neustadt, L.L.P.

(57) ABSTRACT

A slot machine scrolls symbols on a plurality of defined areas provided on a display at a time of executing a slot game, and thereafter rearranges the symbols on the respective defied areas. In a case where a trigger symbol is rearranged on a defined area, the slot machine links display contents of symbols with one another and variable display operations of symbols with one another on a prescribed range of the defined areas.

24 Claims, 18 Drawing Sheets

FIG. 6

AWARD SETTING TABLE

| | 15 PIECES | 14 PIECES | 13 PIECES | 12 PIECES | 11 PIECES | 10 PIECES | 9 PIECES | 8 PIECES | 7 PIECES | 6 PIECES | 5 PIECES | 4 PIECES | 3 PIECES |
|---|---|---|---|---|---|---|---|---|---|---|---|---|---|
| 7 | 5,000 | 4,000 | 3,000 | 2,000 | 1,000 | 500 | 300 | 200 | 150 | 100 | 75 | 50 | 30 |
| BAR | 4,000 | 3,000 | 2,000 | 1,000 | 500 | 300 | 200 | 150 | 100 | 75 | 50 | 30 | 20 |
| ☀ | 3,000 | 2,000 | 1,000 | 500 | 300 | 200 | 150 | 100 | 75 | 50 | 30 | 20 | 15 |
| ♥ | 2,000 | 1,000 | 500 | 300 | 200 | 150 | 100 | 75 | 50 | 30 | 20 | 15 | 10 |
| K | 1,000 | 500 | 250 | 200 | 150 | 100 | 75 | 50 | 30 | 20 | 15 | 10 | 5 |
| Q | 500 | 250 | 200 | 150 | 100 | 75 | 50 | 30 | 20 | 15 | 10 | 5 | 2 |
| J | 250 | 200 | 150 | 100 | 75 | 50 | 30 | 20 | 15 | 10 | 5 | 2 | 1 |

SLOT MACHINE AND ASSOCIATED METHODOLOGY OF LINKING SYMBOLS TO PROVIDE A VARIABLE DISPLAY FUNCTION HAVING FEATURE IN LINKING DISPLAY CONTENTS OF SYMBOLS WITH ONE ANOTHER AND VARIABLE DISPLAY OPERATIONS OF SYMBOLS WITH ONE ANOTHER

CROSS REFERENCE TO RELATED APPLICATION

This application claims priority to U.S. provisional patent application Ser. No. 61/042,147 entitled "SLOT MACHINE HAVING VARIETY OF AWARDS WITH POINT-ALLOCATED SYMBOLS AND CONTROL METHOD THEREOF" filed on Apr. 3, 2008 and naming Kazumasa YOSHIZAWA as inventor, and which is incorporated by reference herein for all purposes.

BACKGROUND OF THE INVENTION

1. Field of the Invention

The present invention relates to a slot machine that plays a game by using a medal or the like, and to a control method of the slot machine.

2. Description of Related Art

As related slot machines, for example, those disclosed in U.S. Pat. No. 6,960,133 B1 and U.S. Pat. No. 6,012,983 are known. In such a slot machine, when a player inserts a monetary value such as a medal, a coin or a bill into an insertion slot of the slot machine and operates a spin switch, for example, totally 15 symbols with a matrix of three rows and five columns are scrolled on display areas of a display provided on a front surface of a cabinet, and thereafter, the respective symbols automatically stop. Then, in the case where a predetermined number of scatter symbols are displayed when the respective 15 symbols stop, an award is generated.

In such a slot machine, the award is only decided depending on the number of appeared scatter symbols, and a slot machine provided with a new entertainment factor is desired to appear.

SUMMARY OF THE INVENTION

In accordance with an aspect of the present invention, provided is a slot machine, including: a display that displays a unit game in which a plurality of arranged symbols are rearranged individually on defined areas; and a controller programmed to execute: (A) processing for deciding a rearrangement pattern of the symbols to be rearranged on the defined areas; (B) processing for determining whether a trigger symbol that links display contents of symbols with one another and variable display operations of symbols with one another in a prescribed range of the defined areas exists in the rearrangement pattern decided by the processing for deciding a rearrangement pattern; (C) processing for rearranging the trigger symbol on a defined area in a case where the trigger symbol exists; and (D) processing for setting defined areas prescribed by the trigger symbol to an enlarged defined area and rearranging one of the symbols on the enlarged defined area, after the processing for rearranging the trigger symbol on a defined area.

In accordance with another aspect of the present invention, provided is a slot machine, including: a display that displays a unit game in which a plurality of arranged symbols are rearranged individually on defined areas; and a controller programmed to execute: (A) processing for deciding a rearrangement pattern of the symbols to be rearranged on the defined areas; (B) processing for determining whether a trigger symbol that links display contents of symbols with one another and variable display operations of symbols with one another in a prescribed range of the defined areas exists in the rearrangement pattern decided by the processing for deciding a rearrangement pattern; (C) processing for rearranging the trigger symbol on a defined area in a case where the trigger symbol exists; and (D) processing for linking the display contents of symbols with one another and the variable display operations of symbols with one another on each column and/or each row in a range of defined areas prescribed by the trigger symbol after the processing for rearranging the trigger symbol on the defined area.

In accordance with another aspect of the present invention, provided is a slot machine, including: a display that displays a unit game in which a plurality of arranged symbols are rearranged individually on defined areas; and a controller programmed to execute: (A) processing for rearranging a trigger symbol on a defined area; (B) processing for setting the defined area on which the trigger symbol is rearranged and defined areas on a periphery of the defined area on which the trigger symbol is rearranged, the defined area being taken as a center, to an enlarged defined area on which one of the symbols is displayed; and (C) processing for scrolling symbols on the enlarged defined area in a scroll direction different from a usual scroll direction.

In accordance with another aspect of the present invention, provided is a slot machine, including: a display that displays a unit game in which a plurality of arranged symbols are rearranged individually on defined areas; and a controller programmed to execute: (A) processing for rearranging a trigger symbol on the defined area; (B) processing for scrolling symbols on the defined area on which the trigger symbol is rearranged and defined areas on a periphery of the defined area on which the trigger symbol is rearranged, the defined area being taken as a center, in a scroll direction different from a usual scroll direction; and (C) processing, in a case where a predetermined number of the same symbols are rearranged on the defined areas, for generating an award that is based on the number of the same symbols.

In accordance with another aspect of the present invention, provided is a control method of a slot machine, including: (A) deciding a rearrangement pattern of symbols to be rearranged on defined areas; (B) determining whether a trigger symbol that links display contents of symbols with one another and variable display operations of symbols with one another in a prescribed range of the defined areas exists in the rearrangement pattern decided by the processing for deciding a rearrangement pattern; (C) rearranging the trigger symbol on a defined area in a case where the trigger symbol exists; and (D) after processing for rearranging the trigger symbol on the defined area, setting defined areas prescribed by the trigger symbol to an enlarged defined area and rearranging one of the symbols on the enlarged defined area.

In accordance with another aspect of the present invention, provided is a control method of a slot machine, including: (A) deciding a rearrangement pattern of symbols to be rearranged on defined areas; (B) determining whether a trigger symbol that links display contents of symbols with one another and variable display operations of symbols with one another in a prescribed range of the defined areas exists in the rearrangement pattern decided by the processing for deciding a rearrangement pattern; (C) rearranging the trigger symbol on a defined area in a case where the trigger symbol exists; and (D)

linking the display contents of symbols with one another and variable display operations of symbols with one another on each column and/or each row in a range of defined areas prescribed by the trigger symbol after rearranging the trigger symbol on the defined area.

In accordance with another aspect of the present invention, provided is a control method of a slot machine, including: (A) rearranging a trigger symbol on a defined area; (B) setting the defined area on which the trigger symbol is rearranged and defined areas on a periphery of the defined area on which the trigger symbol is rearranged, the defined area being taken as a center, to an enlarged defined area on which one of the symbols is rearranged; and (C) scrolling symbols on the enlarged defined area in a scroll direction different from a usual scroll direction.

In accordance with another aspect of the present invention, provided is a control method of a slot machine, including: (A) rearranging a trigger symbol on a defined area; (B) scrolling symbols on the defined area on which the trigger symbol is rearranged and defined areas on a periphery of the defined area on which the trigger symbol is rearranged, the defined area being taken as a center, in a scroll direction different from a usual scroll direction; and (C) in a case where a predetermined number of the same symbols are rearranged on the defined areas, generating an award that is based on the number of the same symbols.

BRIEF DESCRIPTION OF THE DRAWINGS

FIG. 6 is a view showing an example of an award setting table for use in the slot machine according to the first embodiment of the present invention.

DETAILED DESCRIPTION OF THE EMBODIMENT

First Embodiment

Figure 7:
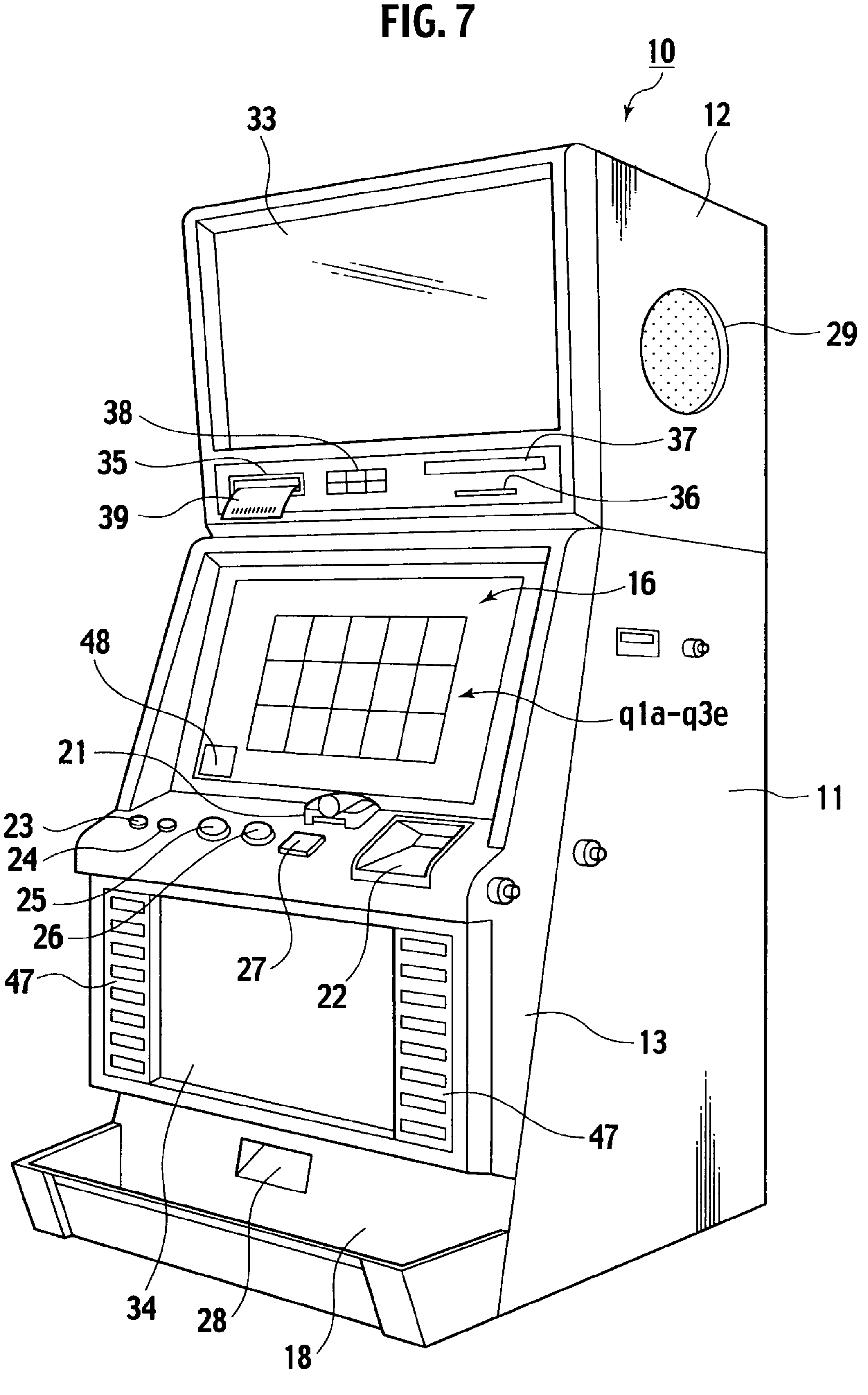
FIG. 7 is an entire configuration view of the slot machine according to the first embodiment of the present invention.
Figure 8:
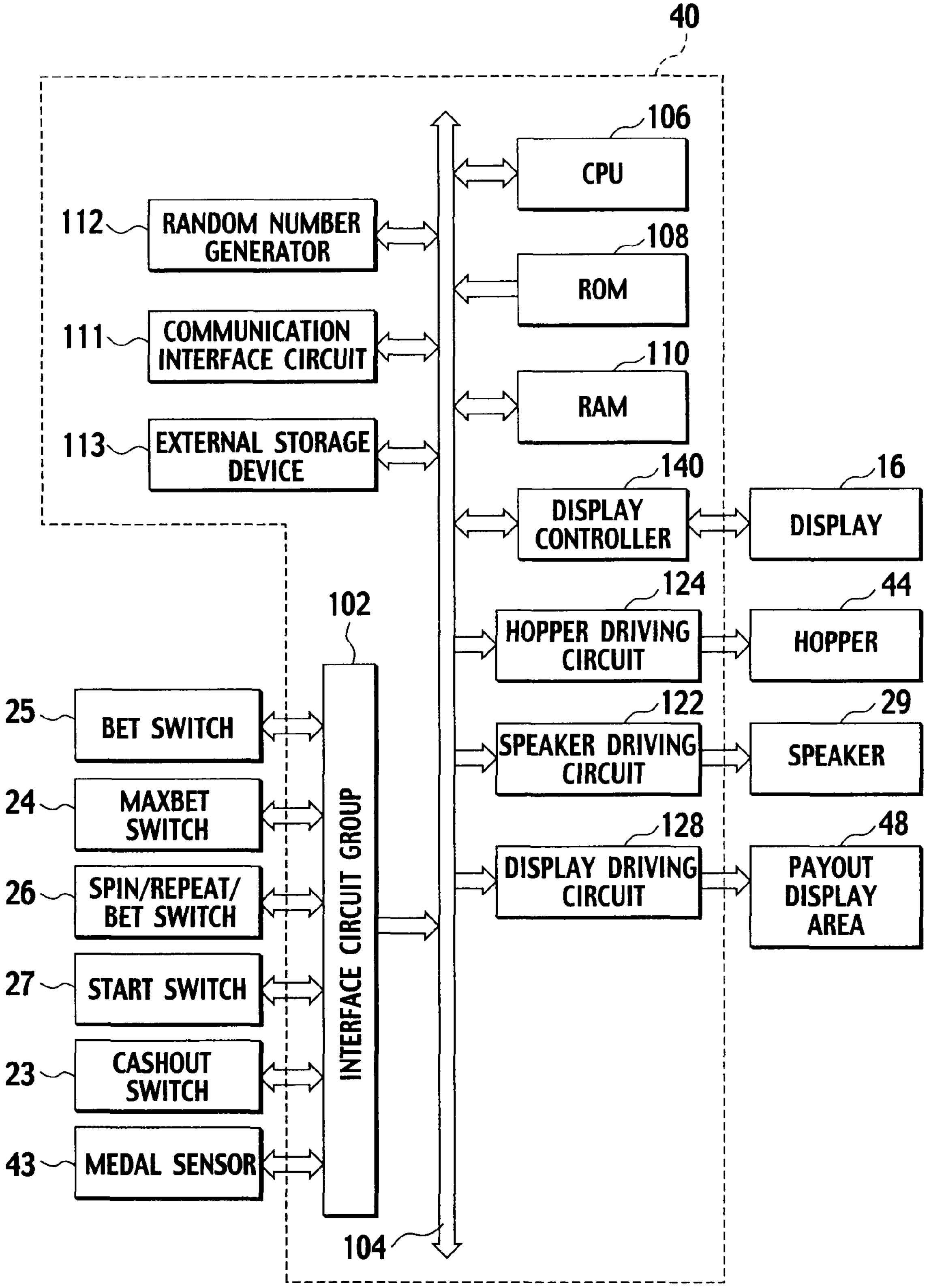
FIG. 8 is a block diagram showing an internal configuration of the slot machine according to the first embodiment of the present invention.

FIGS. 1 to 5 are explanatory views showing examples of displays on a display 16 when a trigger symbol is rearranged on the display of a slot machine according to a first embodiment of the present invention, FIG. 6 is an explanatory view showing an example of an award setting table of the slot machine according to the first embodiment, FIG. 7 is an exterior appearance view of the slot machine according to the first embodiment, and FIG. 8 is a block diagram showing an electric configuration of the slot machine according to the first embodiment. When a slot game is executed, totally 15 symbols with a matrix of three rows and five columns, which are displayed on defined areas q1*a* to q3*e* of the display 16 shown in FIG. 9, start to scroll, and after elapse of a predetermined time, the symbols stop sequentially (the arranged symbols are rearranged). As a result, the 15 symbols are rearranged.

Then, in the slot machine according to the first embodiment of the present invention, in the case where a predetermined number of the same symbols are rearranged, an award that is based on the number of the same symbols is generated. Specifically, the award setting table shown in FIG. 6 is stored in a predetermined memory area of a RAM 110 of FIG. 8, and the award to be given to a player is decided with reference to this award setting table.

In the case where the trigger symbol is rearranged on one of the defined areas q1*a* to q3*e*, the slot machine according to the first embodiment of the present invention links display contents of symbols with one another and variable display operations of the symbols with one another, in a range of defined areas prescribed by the trigger symbol. While it has been heretofore difficult to allow the player to grasp expectations for a unit game since the display contents and variable display operations of the symbols have been displayed on the individual defined areas q1*a* to q3*e*, the slot machine according to the first embodiment of the present invention links the display contents of symbols with one another and the variable display operations of symbols with one another within a fixed range, thus making it possible to clearly indicate, to the player, that the unit game of this time is a chance.

Next, a description will be made in detail of a configuration of the slot machine 10 according to embodiments. As shown in FIG. 7, the slot machine 10 according to the first embodiment includes a cabinet 11, a top box 12 provided on an upper side of the cabinet 11 concerned, and a main door 13. On the cabinet 11, on a surface thereof facing to the player, the display 16 is provided. Moreover, in the cabinet 11, there are provided a variety of constituent members including a controller 40 (refer to FIG. 8) for electrically controlling this slot machine 10, a hopper 44 (refer to FIG. 8) for controlling insertion, storage and payout of medals, and the like.

Moreover, though the medals are mentioned as an example of game media for use in the case of executing the unit game, the game media are not limited to the medals, and for example, coins, tokens, electronic money, or electronic valuable information (credit) corresponding to these can be mentioned.

Figure 9:
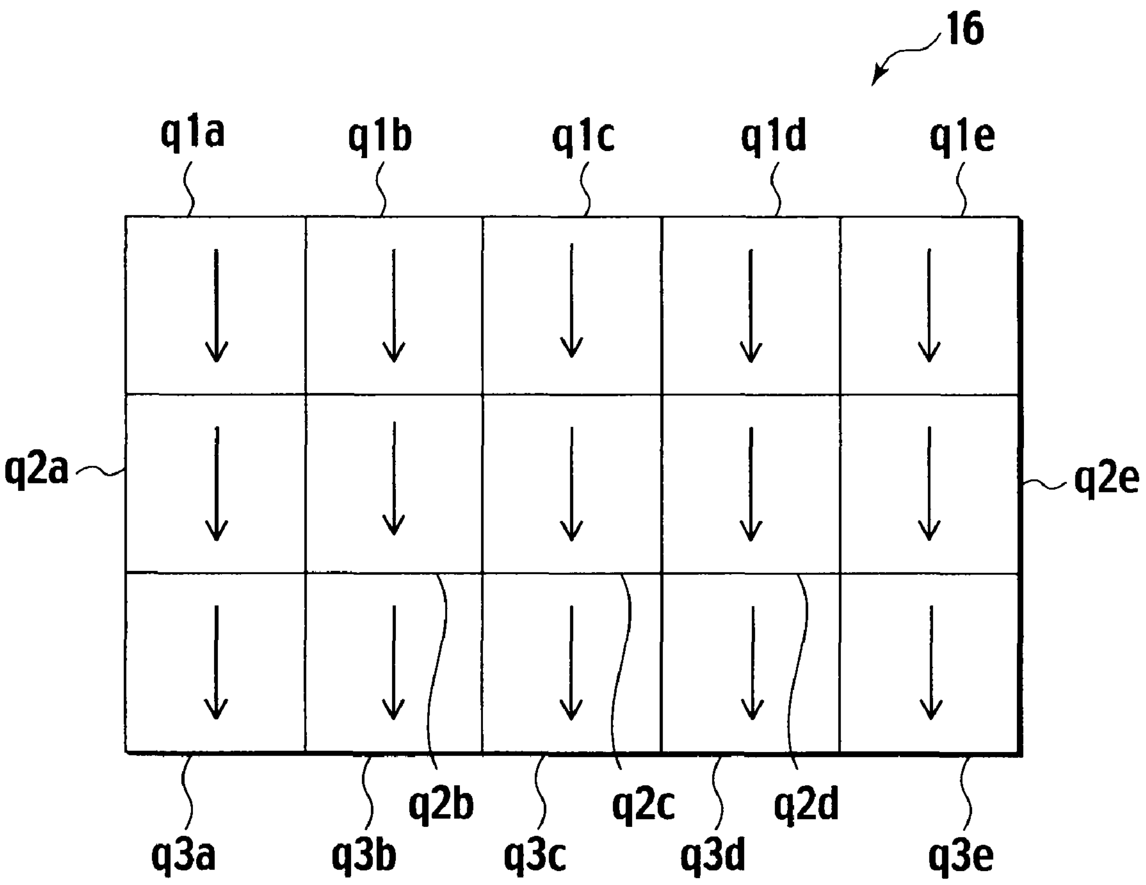
FIG. 9 is a view showing defined areas on the display of the slot machine according to the first embodiment of the present invention.

The main door 13 is attached to the cabinet 11 so as to be openable/closable, and the display 16 is provided on a substantial center of the main door 13. As will be described later, the display 16 displays images regarding a variety of the unit games including the slot game. In the slot game, as shown in FIG. 7 and FIG. 9, the symbols arranged on the totally 15 defined areas q1*a* to q3*e* provided in such a matrix shape of three rows and five columns, are scrolled, and are thereafter stopped (the arranged symbols are rearranged). Then, as will be described later, in the case where a predetermined number (for example, three or more) of each type of the symbols stopped on the respective defined areas q1*a* to q3*e* are rearranged, the award that is based on the number of the same symbols is generated.

Here, as shown in FIG. 9, suffixes "a" to "e" added to the defined areas q denote the columns, and suffixes "1" to "3" added thereto denote the rows. Note that, though the defined areas in the case of executing the slot game are set to have the three columns and the five rows in this embodiment, the present invention is not limited to this.

Moreover, on a lower left area of the display 16 shown in FIG. 7, a number-of-payouts defined area 48 for displaying the number of payouts is provided.

Below the display 16, there are provided a medal insertion slot 21 for inserting therethrough the medals for use in the case of playing the game, and a bill identifier 22 for identifying whether or not a bill is a real one and receiving the real bill. Moreover, a variety of operation switches are provided in the vicinities of the medal insertion slot 21 and the bill identifier 22.

As the operation switches, there are provided a CASHOUT switch 23, a MAX BET switch 24, a BET switch 25, a SPIN/REPEAT/BET switch 26 and a START switch 27.

The BET switch 25 is a switch for deciding the number of credits to be bet on the slot game executed on the display 16, and every time when the BET switch 25 is pressed, a credit equivalent to one medal is bet.

The SPIN/REPEAT/BET switch 26 is a switch for betting credits again without changing the number of credits bet by the above-described BET switch 25 in the unit game executed last time, thereby performing the slot game.

The START switch 27 is a switch for starting the slot game on the display 16 after the credits are bet. When the START switch 27 is pressed after the medals are inserted into the medal insertion slot 21 or after the credits are bet by the BET switch 25, the slot game is started on the respective defined areas q1*a* to q3*e* of the display 16.

The CASHOUT switch 23 is a switch for paying out the inserted medals. The medals to be paid out are discharged from a medal payout port 28 open at a lower portion of a front surface of the main door 13, and the discharged medals are accumulated in a medal tray 18.

The MAX BET switch 24 is a switch for betting, by one operation, the maximum number (for example, equivalent to 30 medals) of credits bettable in one unit game.

On the front surface of the lower portion of the main door 13, a foot display 34 is provided, and displays a variety of images regarding the unit game of the slot machine 10. As such images, for example, a character of the slot machine 10 and the like can be mentioned.

On both sides of the foot display 34, lamps 47 are provided, and emit light based on a light-emitting pattern pre-set for the play of the slot machine 10. The medal payout port 28 is provided below the foot display 34.

On the front surface of the top box 12, an upper display 33 is provided. The upper display 33 includes a display panel, and relationships between points and the awards, which are assigned to the symbols, and the like are displayed thereon.

Moreover, speakers 29 are provided in the top box 12. Below the upper display 33, there are provided a ticket printer 35, a card reader 36, a data display 37 and a keypad 38. The ticket printer 35 prints, on a ticket, a bar code in which the respective data such as the number of credits, a date, and an identification number of the slot machine 10 are encoded, and outputs the ticket as a bar code-added ticket 39.

The player allows another slot machine to read the bar code-added ticket 39, and thereby can perform the game on the slot machine concerned, and can exchange the bar code-added ticket 39 with bills or the like at a predetermined spot (for example, a casher in a casino) of a game arcade.

The card reader 36 is capable of receiving a smart card, and reads data from the smart card inserted thereinto, and writes data into the smart card. The smart card is a card carried by the player, in which data for identifying the player, data regarding a history of the games performed by the player, and the like are stored.

FIG. 8 is a block diagram showing an electric configuration of the controller 40 provided in the slot machine 10 according to this embodiment, and of the variety of instruments connected to the controller 40. The controller 40 of the slot machine 10, which is shown in FIG. 8, is a microcomputer, and includes an interface circuit group 102, an input/output bus 104, a CPU 106, a ROM 108, a RAM 110, a communication interface circuit 111, a random number generator 112, an external storage device 113, a speaker driving circuit 122, a hopper driving circuit 124, a display driving circuit 128 and a display controller 140.

The interface circuit group 102 is connected to the input/output bus 104, and the input/output bus 104 transfers a data signal or an address signal with the CPU 106.

The START switch 27 is connected to the interface circuit group 102. A starting signal outputted from the START switch 27 is converted into a predetermined signal in the interface circuit group 102, and is then transmitted to the CPU 106 through the input/output bus 104.

Moreover, to the interface circuit group 102, there are connected the BET switch 25, the MAX BET switch 24, the SPIN/REPEAT/BET switch 26 and the CASHOUT switch 23. The respective switching signals outputted from the respective switches 25, 24, 26 and 23 are supplied to the interface circuit group 102, are converted into predetermined signals in the interface circuit group 102, and are then transmitted to the CPU 106 through the input/output bus 104.

In addition, a medal sensor 43 is connected to the interface circuit group 102. The medal sensor 43 is a sensor for detecting the medals inserted into the medal insertion slot 21, and is provided in a medal insertion spot of the medal insertion slot 21. A detection signal outputted by the medal sensor 43 is supplied to the interface circuit group 102, is converted into a predetermined signal by the interface circuit group 102, and is then transmitted to the CPU 106 through the input/output bus 104.

To the input/output bus 104, there are connected the ROM 108 in which a system program is stored, and the RAM 110 for storing a variety of data. Moreover, to the input/output bus 104, there are connected the random number generator 112, the communication interface circuit 111, the external storage device 113, the display controller 140, the hopper driving circuit 124, the speaker driving circuit 122 and the display driving circuit 128.

On an occasion that a starting operation for the unit game has been received by the START switch 27, the CPU 106 reads out game execution programs, and executes the slot game. The game execution programs are programs for executing the unit game through the display controller 140 on the display 16. Specifically, the game execution programs are programmed so as to execute the unit game. In the unit game, the award that is based on the number of the same symbols is generated when the symbols are scrolled on the respective display areas q1*a* to q3*e* (refer to FIG. 9), the symbols are then stopped (the arranged symbols are rearranged), and the predetermined number (for example, three or more) of each type of the symbols thus stopped are rearranged.

Moreover, the CPU 106 decides a rearrangement pattern of the symbols to be rearranged on the defined areas q1*a* to q3*e*. The rearrangement pattern is composed of the symbols which are arranged by the predetermined number (for example, three or more) and become subjects of the award, symbols which are not arranged by the predetermined number and do not become the subjects of the award, and the trigger symbol that links the display contents of symbols with one another and the variable display operations of symbols with one another on a prescribed range of the defined areas q1*a* to q3*e*. The trigger symbol according to this embodiment is a lightning-shape symbol shown in FIG. 1. As shown by a diagonally shaded area of FIG. 2, the defined areas q1*c* to q1*e*, q2*c* to q2*e* and q3*c* to q3*e* prescribed by the trigger symbol are a defined area on which the trigger symbol is rearranged and defined areas on the periphery of the defined area on which the trigger symbol is rearranged, the defined area being taken as a center. The above-described areas are composed of totally nine defined areas. For example, in the case of the display 16 composed of three rows, it is possible to set the trigger symbol so that the trigger symbol can be rearranged only on the middle row.

Figure 2:
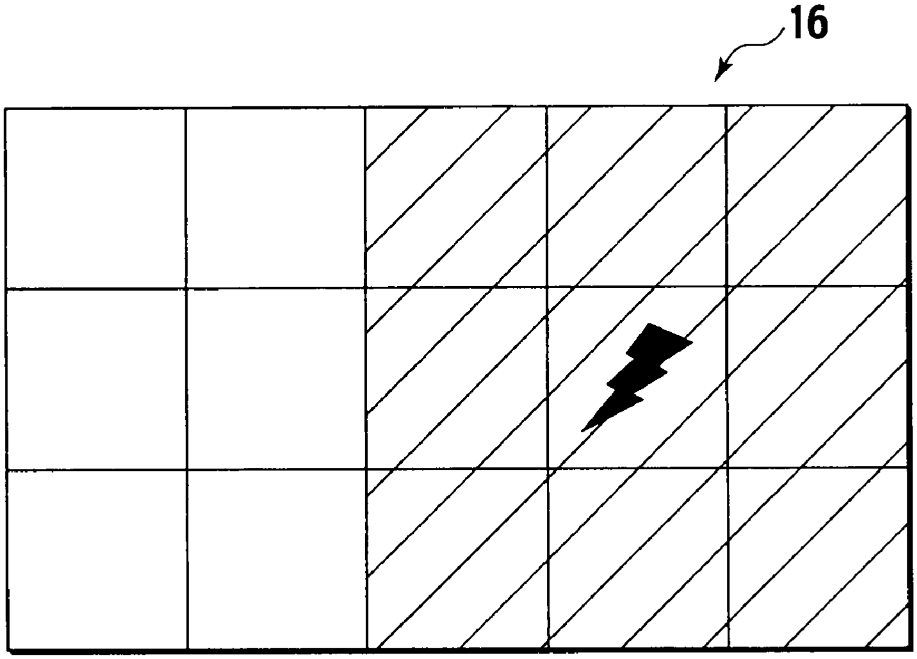
FIG. 2 is a view showing an example of a range of defined areas prescribed by the trigger symbol rearranged on the display of the slot machine according to the first embodiment of the present invention.
Figure 3:
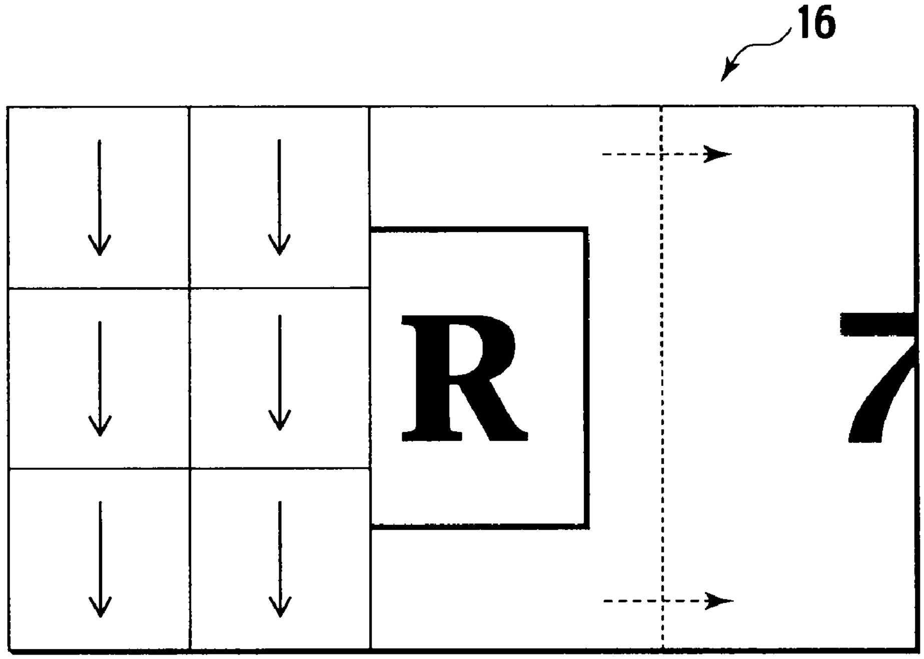
FIG. 3 is a view showing a scroll pattern of symbols on the display of the slot machine according to the first embodiment of the present invention.
Figure 4:
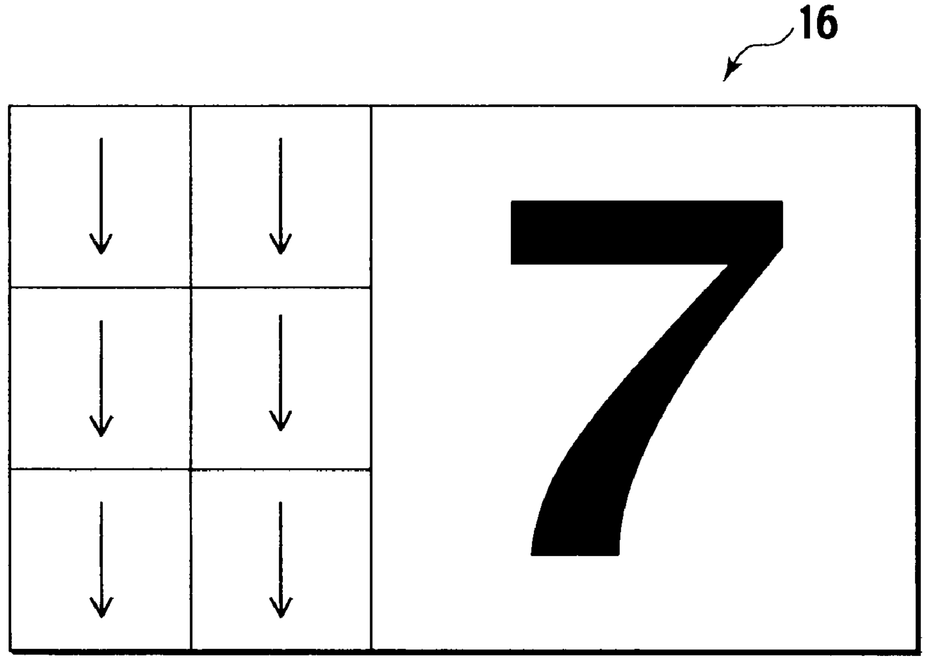
FIG. 4 is a view showing an example of a symbol rearranged on the display of the slot machine according to the first embodiment of the present invention.
Figure 5:
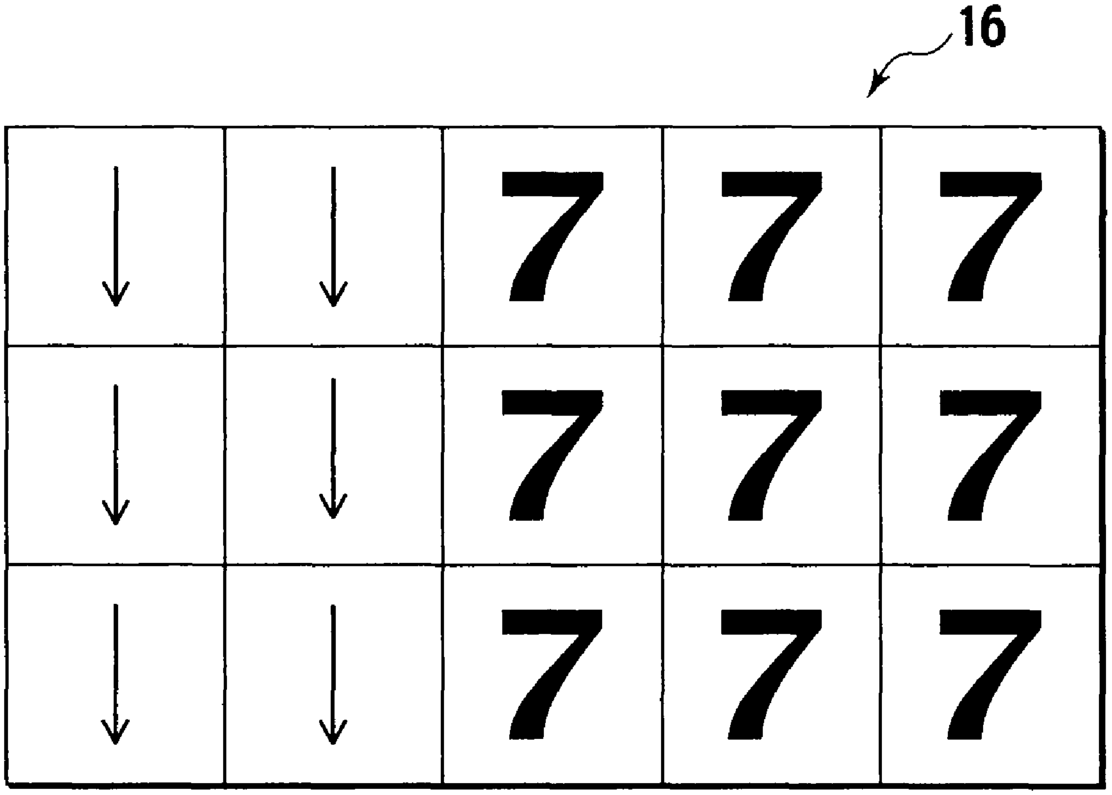
FIG. 5 is a view showing an example of symbols rearranged on the display of the slot machine according to the first embodiment of the present invention.

Furthermore, the CPU 106 determines whether or not the trigger symbol is rearranged on one of the defined areas q1*a* to q3*e* in the rearrangement pattern. In the case of having determined that the trigger symbol is rearranged on one of the defined areas q1*a* to q3*e*, the CPU 106 rearranges the trigger symbol on the one of the defined areas q1*a* to q3*e*. The CPU 106 sets all of the defined areas, which are located in the range prescribed by the trigger symbol as shown in FIG. 2, to an enlarged defined area on which one symbol is displayed as shown in FIG. 3. Then, the CPU 106 links display contents of symbols with one another and variable display operations of symbols with one another in the enlarged defined area. Such linking of the display contents of symbols with one another in the enlarged defined area refers to that, for example, in the case where "7" is displayed on the enlarged defined area as shown in FIG. 4, "7" is displayed in synchronization on the defined areas in the range prescribed by the trigger symbol. Specifically, in the case where "7" is rearranged on the enlarged defined area as shown in FIG. 4, the range of the defined areas prescribed by the trigger symbol is entirely set to "7" as shown in FIG. 5. Such linking of the variable display operations of symbols with one another on the enlarged defined area refers to that, for example, as shown in FIG. 3, in the case where usual scrolling and scrolling of the defined areas other than the defined areas prescribed by the trigger symbol are longitudinal scrolling, the defined areas prescribed by the trigger symbol are scrolled laterally.

After having decided the symbols to be rearranged on the respective defined areas q1*a* to q3*e*, the CPU 106 generates, as an image display command outputted to the display controller 140, a signal of the symbols to be rearranged on the defined areas q1*a* to q3*e*. Specifically, the CPU 106 generates the signal of the image display command corresponding to a state of the unit game and a result of the unit game, and outputs the signal of the image display command to the display controller 140 through the input/output bus 104.

The communication interface circuit 111 is connected to a hall server or the like, and transmits data on a history of plays executed on this slot machine 10, and the like to the hall server. Moreover, the communication interface circuit 111 receives a variety of data transmitted from the hall server.

The random number generator 112 generates random numbers for deciding whether or not to generate a winning combination in the slot game executed on the display 16.

In the external storage device 113, the rearrangement pattern of the symbols to be rearranged on the defined areas q1*a* to q3*e* is stored in advance. Incidentally, the rearrangement pattern of the symbols to be rearranged on the defined areas q1*a* to q3*e* can be provided, for example, in a program of the ROM 108 instead of being stored in the external storage device 113.

The display driving circuit 128 performs a control to display the number of payouts on the number-of-payouts display area 48 set on the lower left area of the display 16.

The speaker driving circuit 122 outputs audio data to the speakers 29. Specifically, the CPU 106 reads out the audio data stored in the ROM 108, and transmits the audio data to the speaker driving circuit 122 through the input/output bus 104. In such a way, a predetermined effect sound is emitted from the speakers 29.

The hopper driving circuit 124 outputs a payout signal to the hopper 44 when cashout occurs. Specifically, upon receiving a cashout signal from the CASHOUT switch 23, the CPU 106 outputs a drive signal to the hopper driving circuit 124 through the input/output bus 104. In such a way, the hopper 44 pays out the medals of the number equivalent to the remaining number of credits at that point of time, which is stored in a predetermined memory area of the RAM 110.

The display controller 140 performs a display control to execute the slot game on the display 16. Specifically, the CPU 106 generates a signal of an image display command corresponding to a state of the slot game and a result of the slot game, and outputs the signal of the image display command to the display controller 140 through the input/output bus 104.

Upon receiving the signal of the image display command, which is outputted from the CPU 106, the display controller 140 creates superimposedly displayed two frame memories, which are to be displayed on the display 16, based on this image display command, and stores the frame memories in the RAM 110. A front frame memory as one of the two frame memories is one that displays an image of a state where the respective defined areas q1*a* to q3*e* are scrolling, and a rear frame memory as the other one of the two frame memories is one that displays an image of the symbols rearranged on the defined areas q1*a* to q3*e*, which are decided by the CPU 106. Moreover, upon receiving the signal of the image display command, which is outputted from the CPU 106, the display controller 140 generates a drive signal for driving the display 16 based on this image display command, and outputs the drive signal thus generated to the display 16. Specifically, switching of the defined areas prescribed by the trigger symbol on the front frame memory to such lateral scrolling is controlled on the display 16. Moreover, the respective defined areas q1*a* to q3*e* of the front frame memory are switched to transparent display, whereby the symbols displayed on the rear frame memory are individually controlled to be visually recognizable on the display 16. In such a way, predetermined images are displayed on the display 16.

Next, a description will be made of relationships between the symbols rearranged on the respective defined areas q1*a* to q3*e* of the display 16 and the awards each of which is to be given to the player based on the number of the same symbols with reference to the award setting table shown in FIG. 6.

Figure 1:
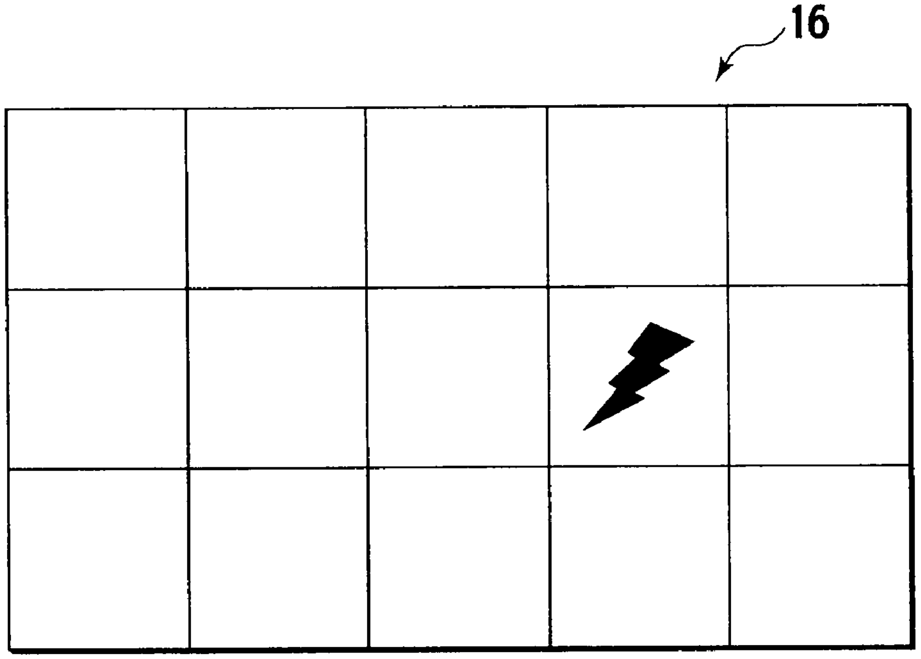
FIG. 1 is a view showing an example of a trigger symbol rearranged on a display of a slot machine according to a first embodiment of the present invention.

On the respective defined areas q1*a* to q3*e* of the display 16, either of the symbols related to totally seven types of the awards, which are “7”, “BAR”, “Sun shape”, “Heart shape”, “K (king)”, “Q (queen)” and “J (jack)”, and of the trigger symbol of “Lightning shape” are rearranged. As shown in FIG. 1 and FIG. 2, the trigger symbol is rearranged only on the middle stage. Moreover, the relationships between the numbers of the respective rearranged symbols and the awards are set as in the award setting table shown in FIG. 6.

For example, in the case where fifteen symbols “7” are displayed, an award equivalent to 5000 pieces is generated, and the number of pieces for the award is gradually reduced as the number of rearranged symbols is reduced. Then, in the case where the number of the symbols “7” is less than three, the award is not generated. Moreover, in the case where fifteen symbols “J” are displayed, an award equivalent to 250 pieces is generated, and the number of pieces for the award is gradually reduced as the number of rearranged symbols is reduced. Then, in the case where the number of the symbols “J” is less than three, the award is not generated.

In the first embodiment, probabilities that the symbols “7”, “BAR”, “Sun shape”, “Heart shape”, “K”, “Q” and “J” are rearranged on the respective defined areas q1*a* to q3*e* are set so as to be increased in this order. Specifically, the probability that the symbol “J” is rearranged is the highest, and the probability that the symbol “7” is rearranged is the lowest. Hence, the controller 40 shown in FIG. 8 controls an effect of the images displayed on the display 16 so that, as the symbols are those generating a larger award, the probability that the symbols concerned are rearranged on the respective defined areas q1*a* to q3*e* can be decreased.

Figure 10:
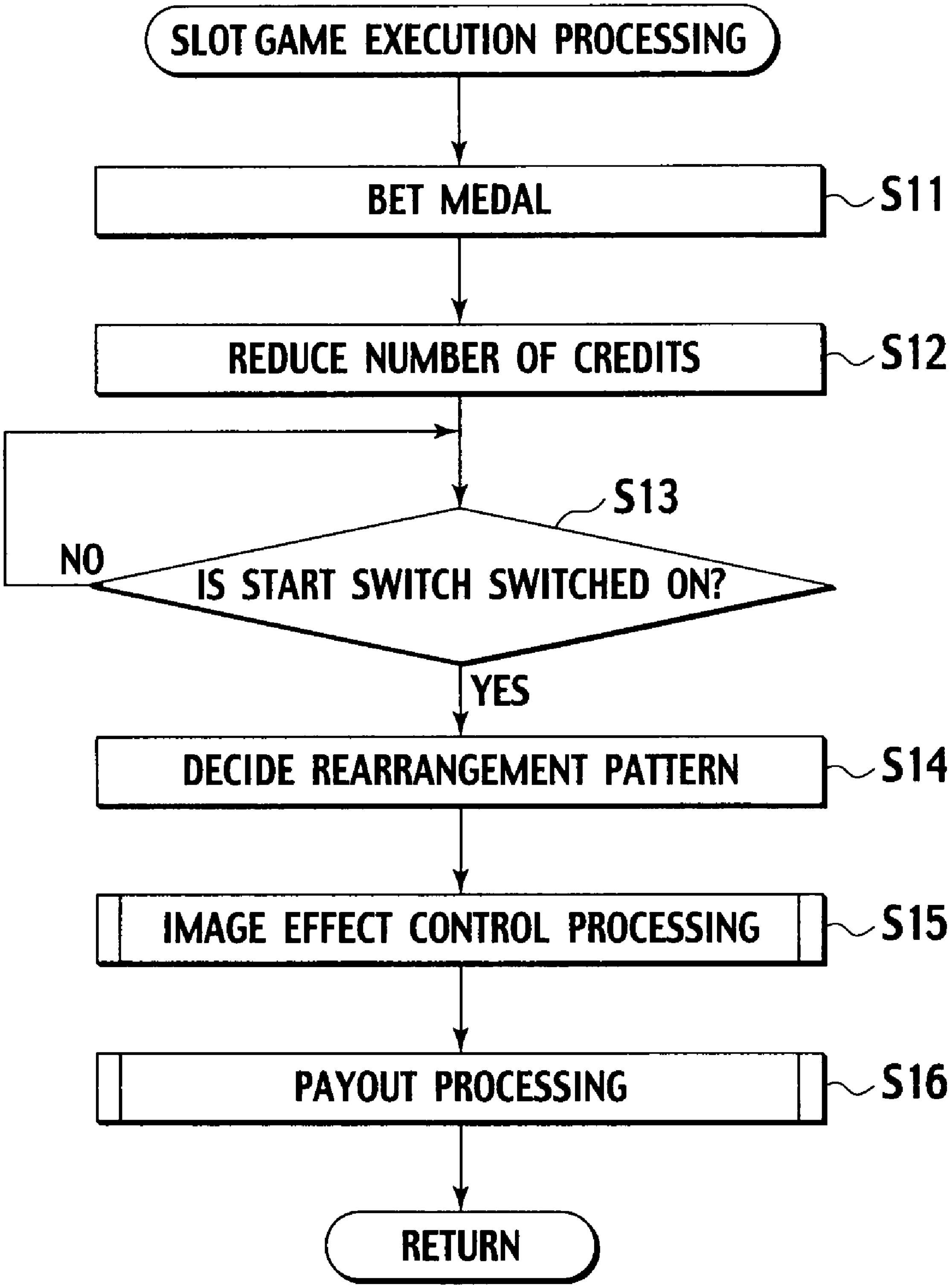
FIG. 10 is a flowchart showing slot game execution processing of the slot machine according to the first embodiment of the present invention.

Next, a description will be made of operations of the slot machine 10 according to the first embodiment with reference to flowcharts shown in FIG. 10, FIG. 11, FIG. 12 and FIG. 13. FIG. 10 is a flowchart showing a procedure of execution processing of the slot game executed on the slot machine 10 according to the first embodiment.

First, the CPU 106 receives a bet of the medals or the credits by the player (Step S11). Specifically, in the case where the player presses the BET switch 25, and bets a desired number of credits, or in the case where the player inserts a desired number of medals from the medal insertion slot 21, such a number is inputted as the number of bets.

In the case where the BET switch 25 has been pressed to place the bet, the CPU 106 reduces the current credits by the bet credits (Step S12). For example, in the case where a bet for the credits “10” is placed when the credits are “30”, the credits are reduced to be “20”.

The CPU 106 determines whether or not the START switch 27 has been switched on (Step S13), and in the case where the START switch 27 has been switched on (YES in Step S13), decides the rearrangement pattern of the symbols to be rearranged on the respective defined areas q1*a* to q3*e* (Step S14). In this processing, the symbols to be rearranged on the defined areas q1*a* to q3*e* are decided by selecting the symbols to be rearranged on the defined areas q1*a* to q3*e* based on the random numbers obtained from the random number generator 112.

After the rearrangement pattern is decided in Step S14, the CPU 106 executes image effect control processing (Step S15). Details of the image effect control processing will be described later.

Subsequently, the CPU 106 performs payout processing that is based on the symbols displayed on the respective defined areas q1*a* to q3*e* and on the sum of the points to be described later (Step S16). Details of the payout processing will be described later.

Next, a description will be made of the image effect control processing shown in Step S15 of FIG. 10 with reference to FIG. 11.

First, the CPU 106 outputs an instruction signal to start the scroll display of the symbols to the display controller 140. Upon receiving this instruction signal, the display controller 140 creates the front frame memory that displays the image of the state where the respective defined areas q1*a* to q3*e* are scrolling. Then, the display controller 140 starts the scroll display of the symbols on the respective defined areas q1*a* to q3*e* of the display 16 (Step S21).

The CPU 106 determines whether or not the trigger symbol exists in the rearrangement pattern decided in Step S14 of FIG. 10 (Step S22). In the case where the trigger symbol exists in the rearrangement pattern (YES in Step S22), the CPU 106 stops the trigger symbol on one of the defined areas q1*a* to q3*e* (Step S23). In the case where the trigger symbol does not exist in the rearrangement pattern (NO in Step S22) the CPU 106 proceeds to Step S26.

The CPU 106 sets the defined areas, which are prescribed by the trigger symbol rearranged in Step S23, to the enlarged defined area as shown in FIG. 3, and links display contents of symbols with one another and variable display operations of symbols with one another (Step S24). Then, the CPU 106 rearranges a symbol on the enlarged defined area as the defined areas prescribed by the trigger symbol (Step S25). In the case where a symbol (for example, “7”) is rearranged on the enlarged defined area as shown in FIG. 4, it is defined that the same symbols (for example, "7") are rearranged on all the defined areas prescribed by the trigger symbol as shown in FIG. 5.

The CPU 106 rearranges the symbols on the defined areas other than those prescribed by the trigger symbol (Step S26). Thereafter, the CPU 106 ends this processing.

Figure 12:
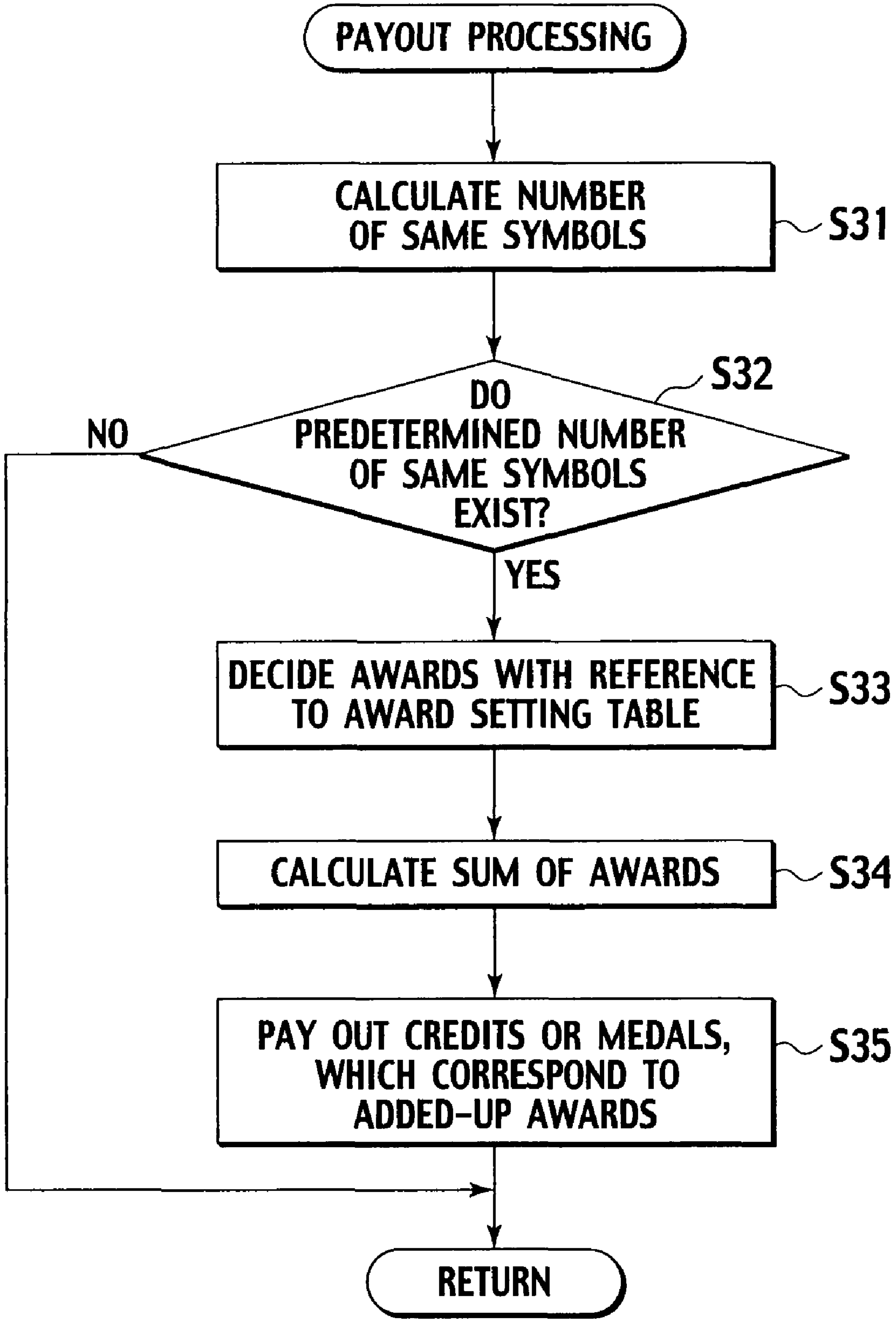
FIG. 12 is a flowchart showing payout processing of the slot machine according to the first embodiment of the present invention.

Next, a description will be made of the payout processing shown in Step S16 of FIG. 10 with reference to FIG. 12.

Figure 11:
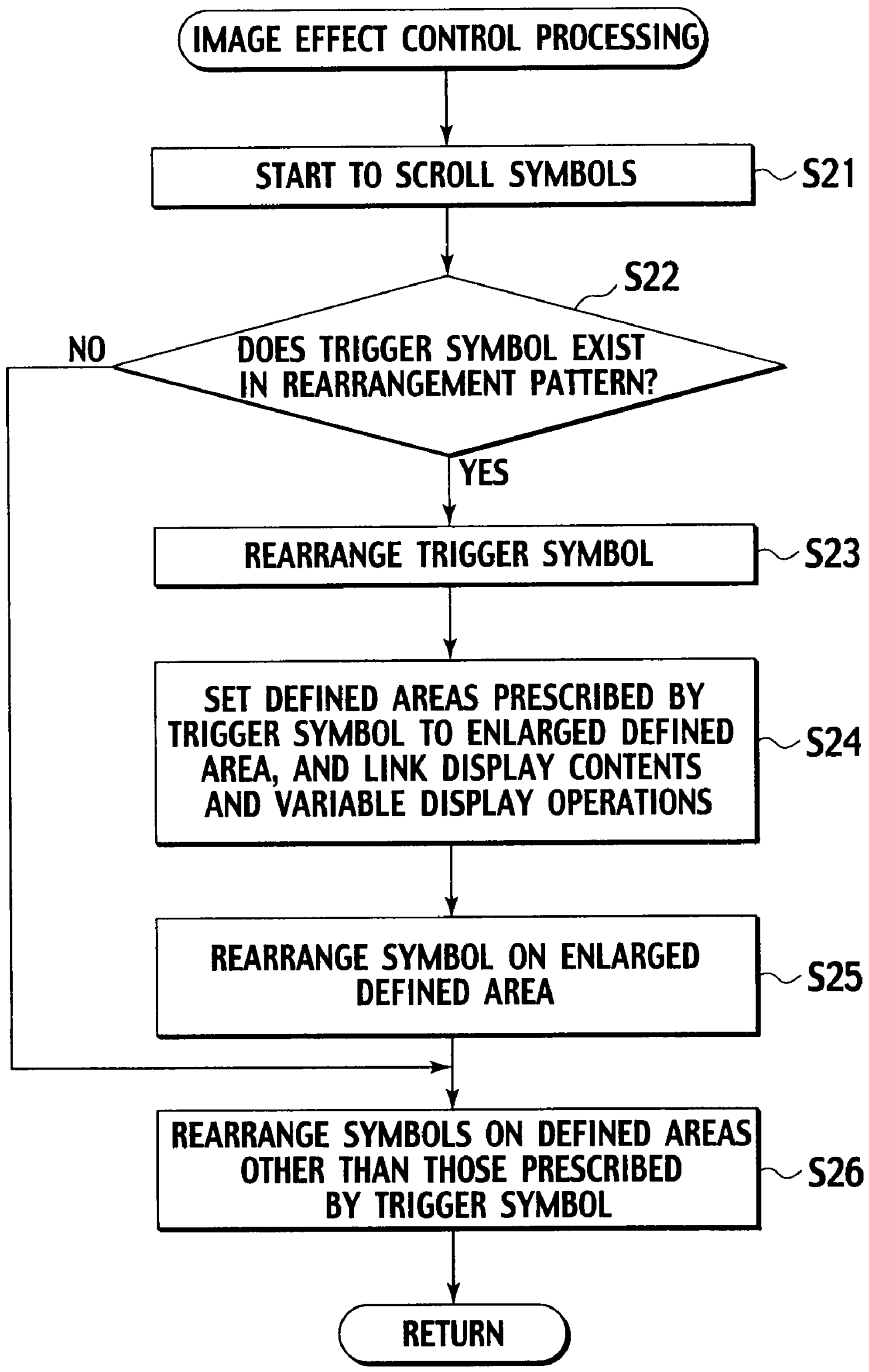
FIG. 11 is a flowchart showing image effect control processing of the slot machine according to the first embodiment of the present invention.

First, the CPU 106 recognizes the symbols stopped by the processing of Step S25 and Step S26 of FIG. 11, and calculates the number of the same symbols (Step S31).

Thereafter, the CPU 106 determines whether or not the symbols exist, in which the number of the same symbols becomes the predetermined number or more (Step S32).

With reference to the award setting table shown in FIG. 6, the CPU 106 decides the awards for the symbols in which the number of the rearranged symbols becomes the predetermined number or more (Step S33). Subsequently, the CPU 106 calculates the sum of the awards (Step S34).

Thereafter, the CPU 106 pays out the credits or the medals, which are equivalent to the sum obtained by adding up the sums of the awards (Step S35). In such a way, the payout processing is performed.

As described above, in the slot machine according to the first embodiment of the present invention, in the case where the trigger symbol is rearranged on one of the defined areas q1*a* to q3*e*, the slot machine according to the first embodiment of the present invention can link the display contents of symbols with one another and the variable display operations of symbols with one another on the defined areas prescribed by the trigger symbol. While it has been heretofore difficult to allow the player to grasp the expectations for the unit game since the display contents of symbols and the variable display operations of symbols have been individually displayed on the defined areas q1*a* to q3*e*, the slot machine according to the first embodiment of the present invention links the display contents of symbols with one another and the variable display operations of symbols with one another within the fixed range, thus making it possible to clearly indicate, to the player, that the unit game of this time is a chance.

Furthermore, in the slot machine according to the first embodiment of the present invention, it becomes possible to indicate, to the player, that the rearrangement of the same symbols on all the defined areas prescribed by the trigger symbol brings a chance in which a high payout is involved.

Modification Example of First Embodiment

Next, a description will be made of a modification example of the slot machine 10 according to the above-described first embodiment. In the slot machine 10 according to the modification example, in the case where a plurality of the trigger symbols exist on some of the defined areas q1*a* to q3*e* and there are defined areas overlapped in ranges of defined areas prescribed by the trigger symbols, display contents of symbols are linked with one another and variable display operations of symbols are linked with one another in the ranges of the defined areas prescribed by the trigger symbols.

Figure 13:
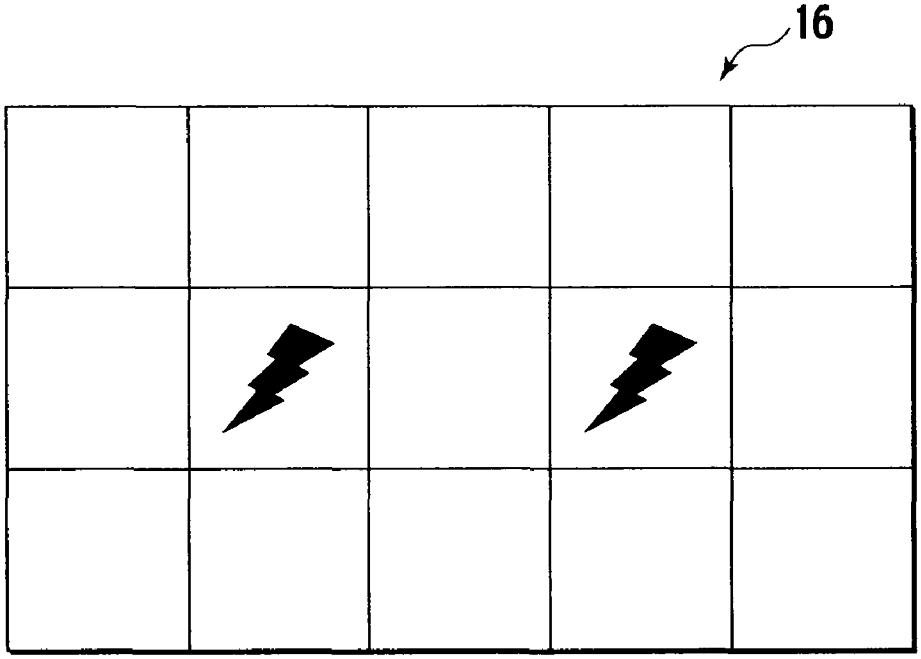
FIG. 13 is a view showing an example of a plurality of the trigger symbols rearranged on a display of a slot machine according to a modification example of the first embodiment of the present invention.
Figure 14:
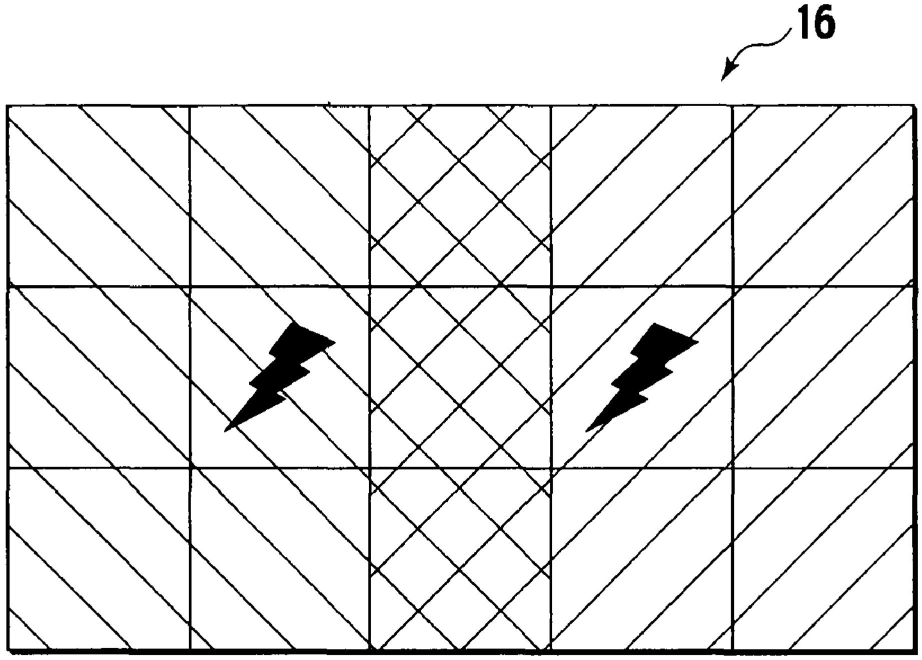
FIG. 14 is a view showing an example of a range of defined areas prescribed by the trigger symbols rearranged on the display of the slot machine according to the modification example of the first embodiment of the present invention.

For example, as shown in FIG. 13, in the case where two trigger symbols exit on two of the defined areas q1*a* to q3*e*, the defined areas prescribed by each of the two trigger symbols are a defined area on which a trigger symbol is rearranged and defined areas on the periphery of the defined area concerned on which the trigger symbol is rearranged, the defined area being taken as a center. Accordingly, as shown in FIG. 14, a column (spot where shaded areas intersect each other) overlapped in the defined areas prescribed by the two trigger symbols becomes defined areas commonly prescribed.

Figure 15:
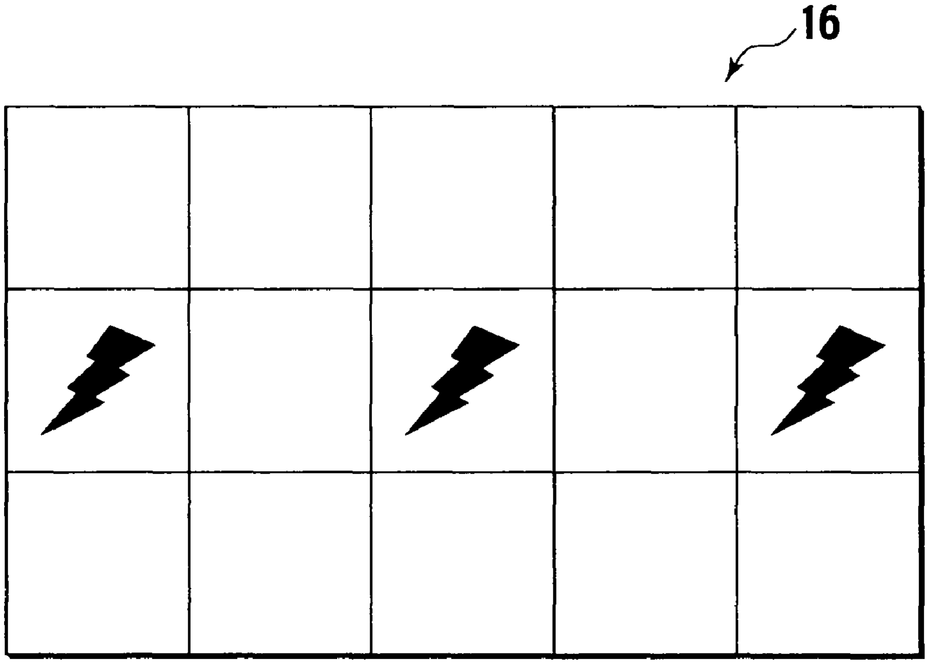
FIG. 15 is a view showing another example of the plurality of trigger symbols rearranged on the display of the slot machine according to the modification example of the first embodiment of the present invention.
Figure 16:
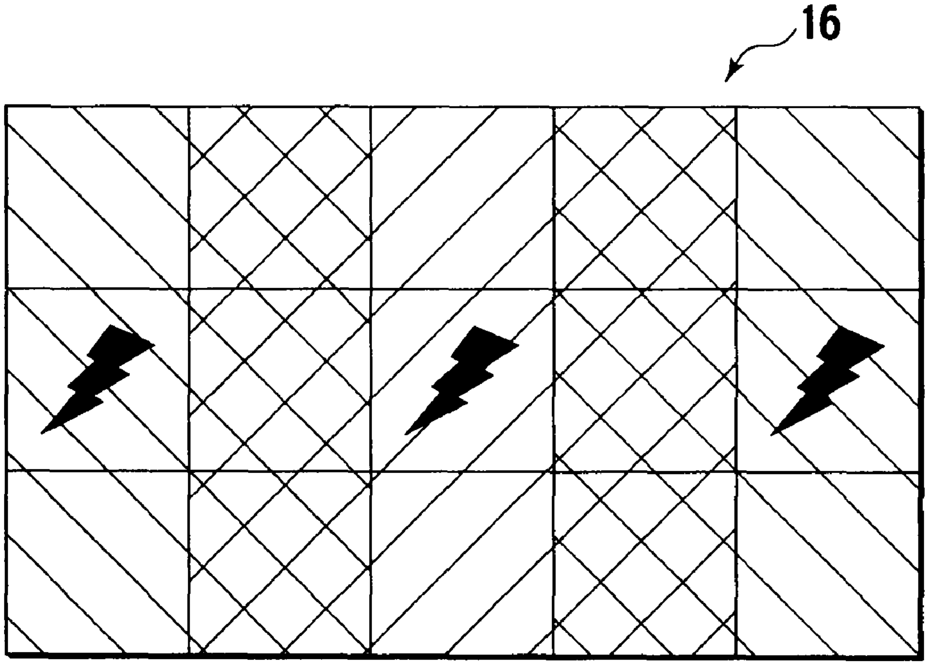
FIG. 16 is a view showing another example of the range of defined areas prescribed by the trigger symbols rearranged on the display of the slot machine according to the modification example of the first embodiment of the present invention.

Moreover, as shown in FIG. 15, in the case where three trigger symbols exist on three of the defined areas q1*a* to q3*e*, the defined areas prescribed by each of the three trigger symbols are a defined area on which a trigger symbol is rearranged and defined areas on the periphery of the defined area concerned on which the trigger symbol is rearranged, the defined area taken as a center. Accordingly, as shown in FIG. 16, columns (spots where shaded areas intersect each other) overlapped in the defined areas prescribed by the three trigger symbols become defined areas commonly prescribed.

Figure 17:
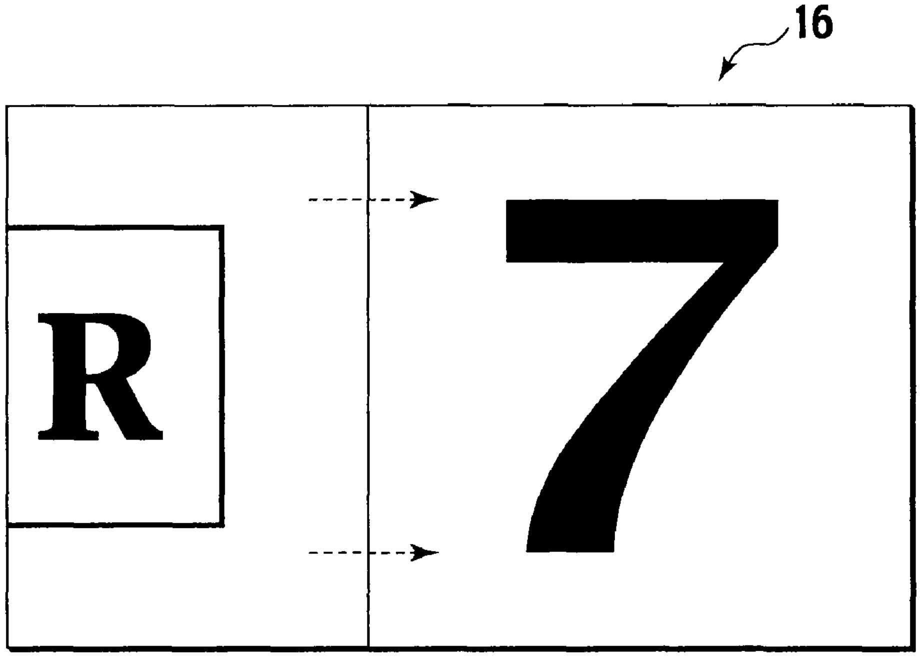
FIG. 17 is a view showing a scroll pattern of symbols on the display of the slot machine according to the modification example of the first embodiment of the present invention.
Figure 18:
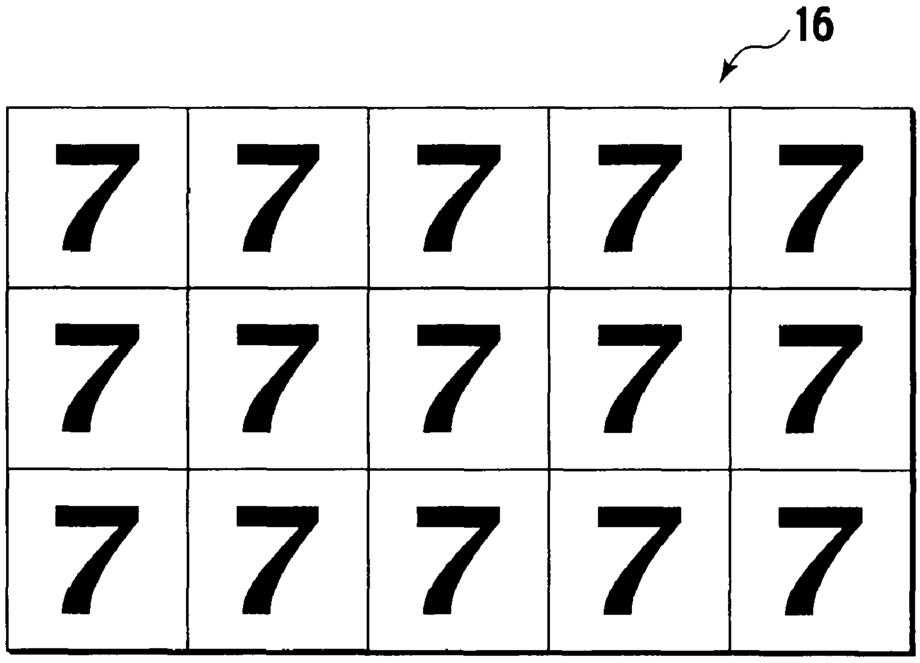
FIG. 18 is a view showing an example of symbols rearranged on the display of the slot machine according to the modification example of the first embodiment of the present invention.

As described above, in the case where the defined areas commonly prescribed by the trigger symbols are provided, the defined areas prescribed by the individual trigger symbols are combined to be set to one enlarged defined area. In the case where the trigger symbols are rearranged as shown in FIG. 13 and FIG. 15, all the defined areas q1*a* to q3*e* are set to the one enlarged defined area as shown in FIG. 17, and the display contents of symbols are linked with one another and the variable display operations of symbols are linked with one another. Then, in the case where "7" is rearranged on the enlarged defined area, all the defined areas prescribed by the trigger symbols become "7" as shown in FIG. 18.

As described above, in the slot machine 10 according to the modification example of the first embodiment of the present invention, the defined areas prescribed by the trigger symbols are increased and the defined areas where the display contents of symbols are linked with one another and the variable display operations of symbols are linked with one another are increased. Accordingly, the rearranged number of the same symbols is increased, thus making it possible to allow the player to expect that the award corresponding to the high payout will be won. Specifically, in the slot machine 10 according to the modification example of the first embodiment of the present invention, it becomes possible to indicate, to the player, that the rearrangement of the plurality of trigger symbols brings a chance in which the high payout is involved.

Second Embodiment

Next, a description will be made of a slot machine 10 according to a second embodiment of the present invention. In the above-described first embodiment, the CPU 106 is configured to set all the defined areas prescribed by the trigger symbol to the enlarged defined area on which one symbol is displayed, and to perform the processing for linking the display contents of symbols with one another and the variable display operations of symbols with one another in the enlarged defined area. However, the CPU 106 can also be configured not to set all the defined areas prescribed by the trigger symbol to the enlarged defined area on which one symbol is displayed, but to perform processing for linking display contents of symbols with one another and variable display operations of symbols with one another on each column and/or each row in the range of the defined areas prescribed by the trigger symbol, without setting all the defined areas to the enlarged defined area on which one symbol is displayed.

In comparison with the slot machine 10 according to the first embodiment, the slot machine 10 according to the second embodiment of the present invention is different therefrom in the processing for linking the display contents of symbols with one another and the variable display operations of symbols with one another on each column and/or each row in the range of the defined areas prescribed by the trigger symbol.

Others are substantially the same as those of the slot machine 10 according to the first embodiment, and accordingly, a duplicate description will be omitted.

The CPU 106 decides the rearrangement pattern of the symbols to be rearranged on the defined areas q1*a* to q3*e*. The rearrangement pattern is composed of the symbols which are arranged by a predetermined number (for example, three or more) and become subjects of the award, the symbols which are not arranged by the predetermined number and do not become the subjects of the award, and the trigger symbol that links the display contents of symbols with one another and the variable display operations of symbols with one another on each column and/or each row in the prescribed range of the defined areas q1*a* to q3*e*. The trigger symbol according to this embodiment is a lightning-shape symbol. The defined areas prescribed by the trigger symbol are a defined area on which the trigger symbol is rearranged and defined areas on the periphery of the defined area concerned on which the trigger symbol is rearranged, the defined area being taken as a center. The above-described areas are composed of totally nine defined areas.

Figure 19:
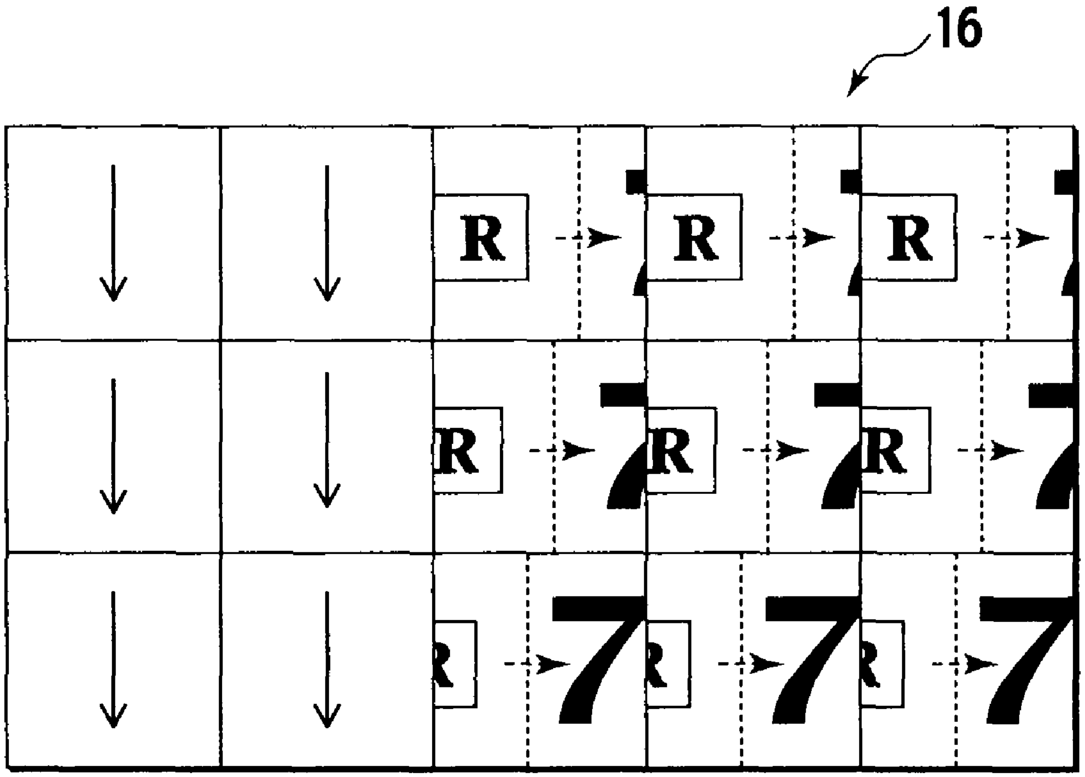
FIG. 19 is a view showing an example of a scroll pattern of symbols on a display of a slot machine according to a second embodiment of the present invention.

Moreover, the CPU 106 determines whether or not the trigger symbol is to be rearranged on one of the defined areas q1*a* to q3*e* in the rearrangement pattern. In the case of having determined that the trigger symbol is to be rearranged on one of the defined areas q1*a* to q3*e*, the CPU 106 rearranges the trigger symbol on the one of the defined areas q1*a* to q3*e*. In all of the defined areas prescribed by the trigger symbol, the CPU 106 links the display contents of symbols with one another and the variable display operations of symbols with one another, without setting all of the defined areas to the enlarged defined area on which one symbol is displayed, as shown in FIG. 19. Such linking of the display contents of symbols with one another on each column and/or each row of in the range of the defined areas prescribed by the trigger symbol refers to that, for example, as shown in FIG. 19, the symbols (for example, “7”) to be displayed on the defined areas prescribed by the trigger symbol are displayed in synchronization on each column and/or each row in the range of the defined areas prescribed by the trigger symbol. Such linking of the variable display operations of symbols with one another on each column and/or each row in the range of the defined areas prescribed by the trigger symbol refers to that, for example, in the case where usual scrolling and scrolling of the defined areas other than the defined areas prescribed by the trigger symbol are longitudinal scrolling, the defined areas prescribed by the trigger symbol are scrolled laterally.

After having decided the symbols to be rearranged on the respective defined areas q1*a* to q3*e*, the CPU 106 generates, as an image display command to be outputted to the display controller 140, a signal of the symbols to be rearranged on the defined areas q1*a* to q3*e*. Specifically, the CPU 106 generates a signal of an image display command corresponding to a state of the unit game and a result of the unit game, and outputs the signal of the image display command to the display controller 140 through the input/output bus 104.

The communication interface circuit 111 is connected to the hall server or the like, and transmits data on a history of plays executed on this slot machine 10, and the like to the hall server. Moreover, the communication interface circuit 111 receives a variety of data transmitted from the hall server.

The random number generator 112 generates random numbers for deciding whether or not to generate a winning combination in the slot game executed on the display 16.

In the external storage device 113, the rearrangement pattern of the symbols rearranged on the defined areas q1*a* to q3*e* is stored in advance. Incidentally, the rearrangement pattern of the symbols rearranged on the defined areas q1*a* to q3*e* can be provided, for example, in the program of the ROM 108 instead of being stored in the external storage device 113.

Figure 20:
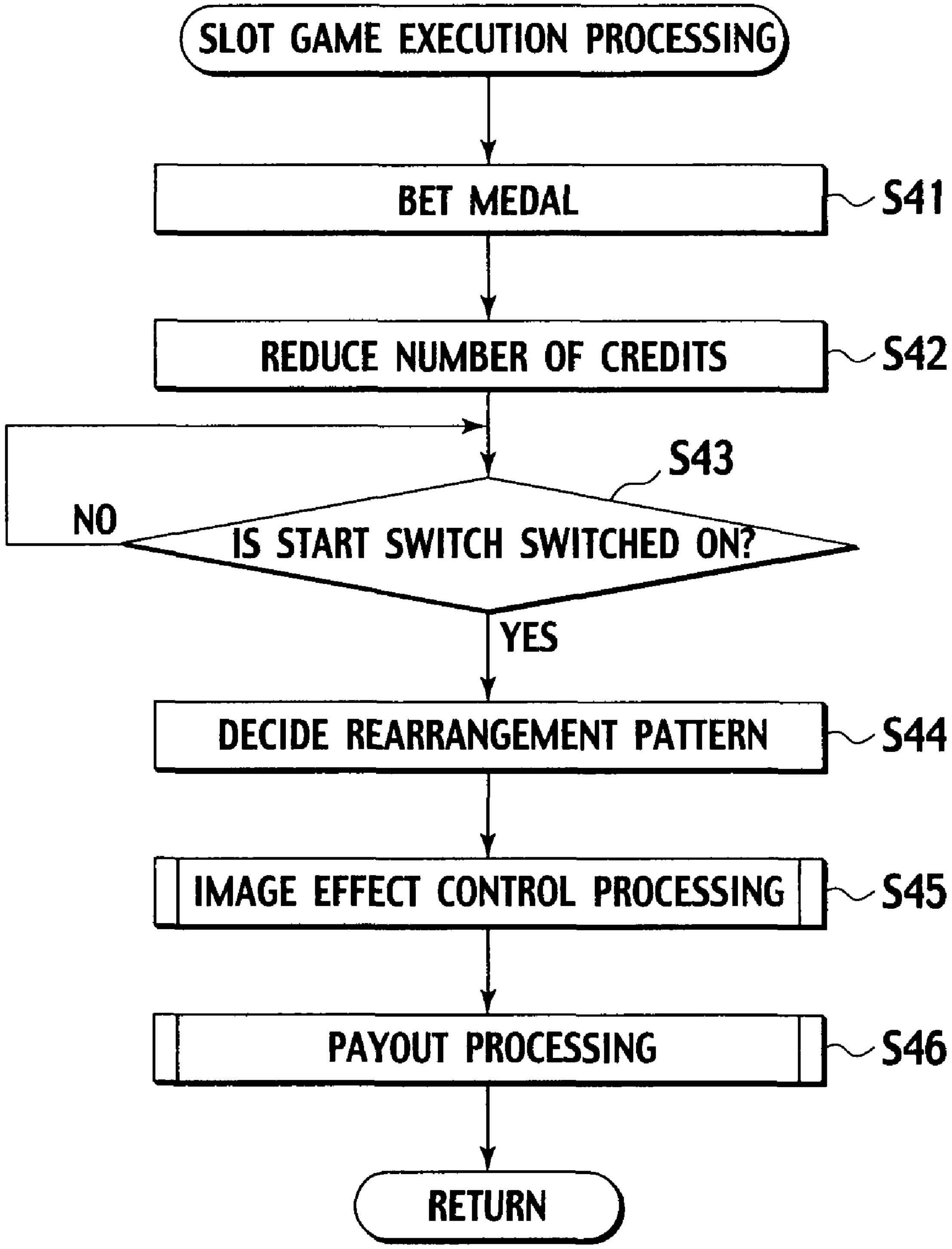
FIG. 20 is a flowchart showing slot game execution processing of the slot machine according to the second embodiment of the present invention.

Next, a description will be made of operations of the slot machine 10 according to the second embodiment with reference to flowcharts shown in FIG. 20, FIG. 21 and FIG. 22. FIG. 20 is a flowchart showing a procedure of execution processing of the slot game executed on the slot machine 10 according to the second embodiment.

First, the CPU 106 receives a bet of the medals or the credits by the player (Step S41). Specifically, in the case where the player presses the BET switch 25 and bets a desired number of credits, or in the case where the player inserts a desired number of medals from the medal insertion slot 21, such a number is inputted as the number of bets.

In the case where the BET switch 25 has been pressed to place the bet, the CPU 106 reduces the current credits by the bet credits (Step S42). For example, in the case where a bet for the credits “10” is placed when the credits are “30”, the credits are reduced to be “20”.

The CPU 106 determines whether or not the START switch 27 has been switched on (Step S43), and in the case where the START switch 27 has been switched on (YES in Step S43), decides the rearrangement pattern of the symbols to be rearranged on the respective defined areas q1*a* to q3*e* (Step S44). In this processing, the symbols to be rearranged on the defined areas q1*a* to q3*e* are decided by selecting the symbols to be rearranged on the defined areas q1*a* to q3*e* based on the random numbers obtained from the random number generator 112.

After the rearrangement pattern is decided in Step S44, the CPU 106 executes image effect control processing (Step S45). Details of the image effect control processing will be described later.

Subsequently, the CPU 106 performs payout processing that is based on the symbols displayed on the respective defined areas q1*a* to q3*e* and on the sum of the points to be described later (Step S46). Details of the payout processing will be described later.

Next, a description will be made of the image effect control processing shown in Step S15 of FIG. 20 with reference to FIG. 21.

First, the CPU 106 outputs an instruction signal to start the scroll display of the symbols to the display controller 140. Upon receiving this instruction signal, the display controller 140 creates the front frame memory that displays the image of the state where the respective defined areas q1*a* to q3*e* are scrolling. Then, the display controller 140 starts the scroll display of the symbols on the respective defined areas q1*a* to q3*e* of the display 16 (Step S51).

The CPU 106 determines whether or not the trigger symbol exists in the rearrangement pattern decided in Step S44 of FIG. 20 (Step S52). In the case where the trigger symbol exists in the rearrangement pattern (YES in Step S52), the CPU 106 stops the trigger symbol on one of the defined areas q1*a* to q3*e* (Step S53). In the case where the trigger symbol does not exist in the rearrangement pattern (NO in Step S52), the CPU 106 proceeds to Step S56.

As shown in FIG. 19, the CPU 106 links the display contents of symbols with one another and the variable display operations of symbols with one another on each column and/or each row in the range of the defined areas prescribed by the trigger symbol rearranged in Step S23 (Step S54). Then, the CPU 106 rearranges the symbols on the defined areas prescribed by the trigger symbol (Step S55).

The CPU 106 rearranges the symbols on the defined areas other than those prescribed by the trigger symbol (Step S56). Thereafter, the CPU 106 ends this processing.

Figure 21:
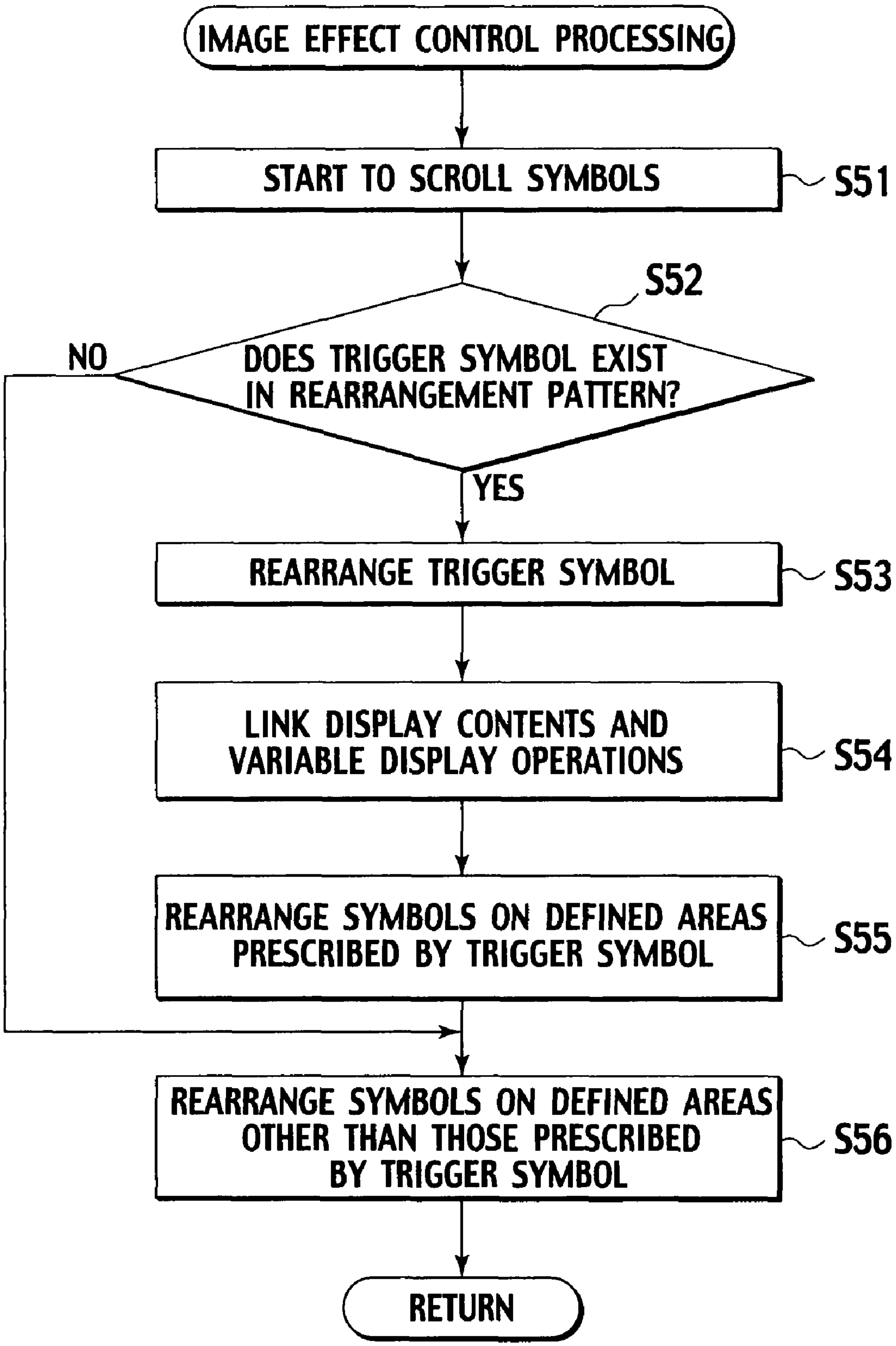
FIG. 21 is a flowchart showing image effect control processing of the slot machine according to the second embodiment of the present invention.
Figure 22:
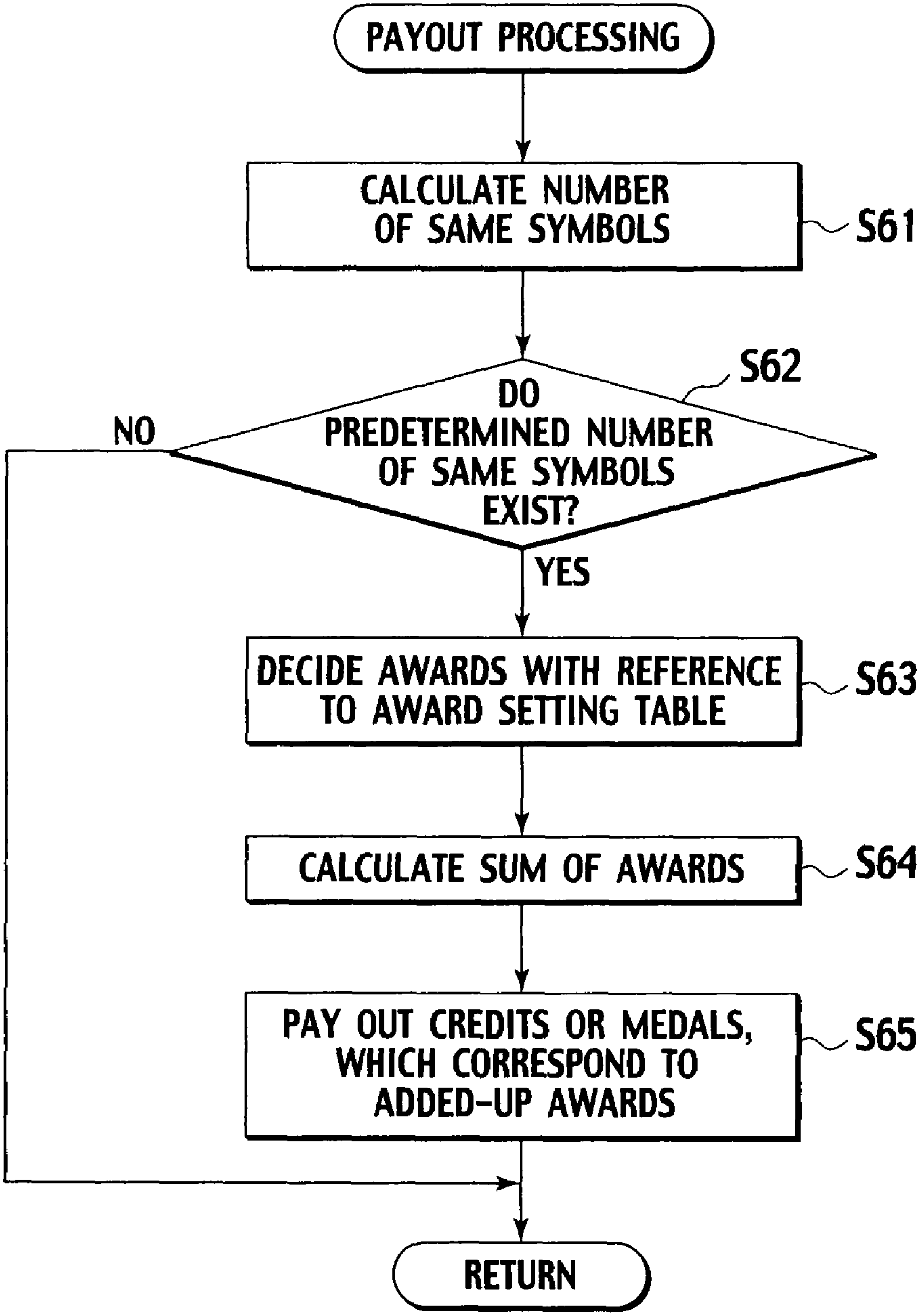
FIG. 22 is a flowchart showing payout processing of the slot machine according to the second embodiment of the present invention.

Incidentally, all the defined areas are not always scrolling at the same timing in the processing of Step S54 of FIG. 21. For example, in the case where the defined areas prescribed by the trigger symbol are three columns and the display made thereon is gradually changed to the next symbols from the right-end column, the symbols on the right-end longitudinal column and the symbols on the left-end and center longitudinal columns sometimes differ from each other in timing of being stopped.

Next, a description will be made of the payout processing shown in Step S46 of FIG. 20 with reference to FIG. 22.

First, the CPU 106 recognizes the symbols stopped by the processing of Step S55 and Step S56 of FIG. 21, and calculates the number of the same symbols (Step S61).

Thereafter, the CPU 106 determines whether or not the symbols exist, in which the number of the same symbols becomes the predetermined number or more (Step S62).

The CPU 106 refers to the award setting table shown in FIG. 6, and decides the awards for the symbols in which the number of the rearranged symbols becomes the predetermined number or more (Step S63). Subsequently, the CPU 106 calculates the sum of the awards (Step S64).

Thereafter, the CPU 106 pays out the credits or the medals, which are equivalent to the sum obtained by adding up the sums of the awards (Step S65). In such a way, the payout processing is performed.

In such a way, also by the slot machine according to the second embodiment of the present invention and by the playing method thereof, similar effects to those of the slot machine according to the first embodiment and the playing method thereof can be obtained.

Moreover, in the slot machine 10 according to the second embodiment of the present invention, all the defined areas are not always scrolling at the same timing. Accordingly, until the scroll is stopped, it is not known how many same symbols are rearranged. Therefore, the player can be allowed to maintain the expectations.

Modification Example of Second Embodiment

Next, a description will be made of a modification example of the slot machine 10 according to the above-described second embodiment. In the slot machine 10 according to the modification example, in the case where a plurality of the trigger symbols exist on some of the defined areas q1*a* to q3*e* and there are defined areas overlapped in ranges of defined areas prescribed by trigger symbols, display contents of symbols are linked with one another and variable display operations of symbols are linked with one another on each column and/or each row in the range of the defined areas prescribed by the trigger symbols.

For example, as shown in FIG. 13, in the case where two trigger symbols exit on two of the defined areas q1*a* to q3*e*, the defined areas prescribed by each of the two trigger symbols are a defined area on which a trigger symbol is rearranged and defined areas on the periphery of the defined area concerned on which the trigger symbol is rearranged, the defined area being taken as a center. Accordingly, as shown in FIG. 14, a column (spot where shaded areas intersect each other) overlapped in the defined areas prescribed by the two trigger symbols becomes defined areas commonly prescribed.

Moreover, as shown in FIG. 15, in the case where three trigger symbols exist on three of the defined areas q1*a* to q3*e*, the defined areas prescribed by each of the three trigger symbols are a defined area on which a trigger symbol is rearranged and the defined areas on the periphery of the defined area concerned on which the trigger symbol is rearranged, the defined area being taken as a center. Accordingly, as shown in FIG. 16, columns (spots where shaded areas intersect each other) overlapped in the defined areas prescribed by the three trigger symbols become defined areas commonly prescribed.

Figure 23:
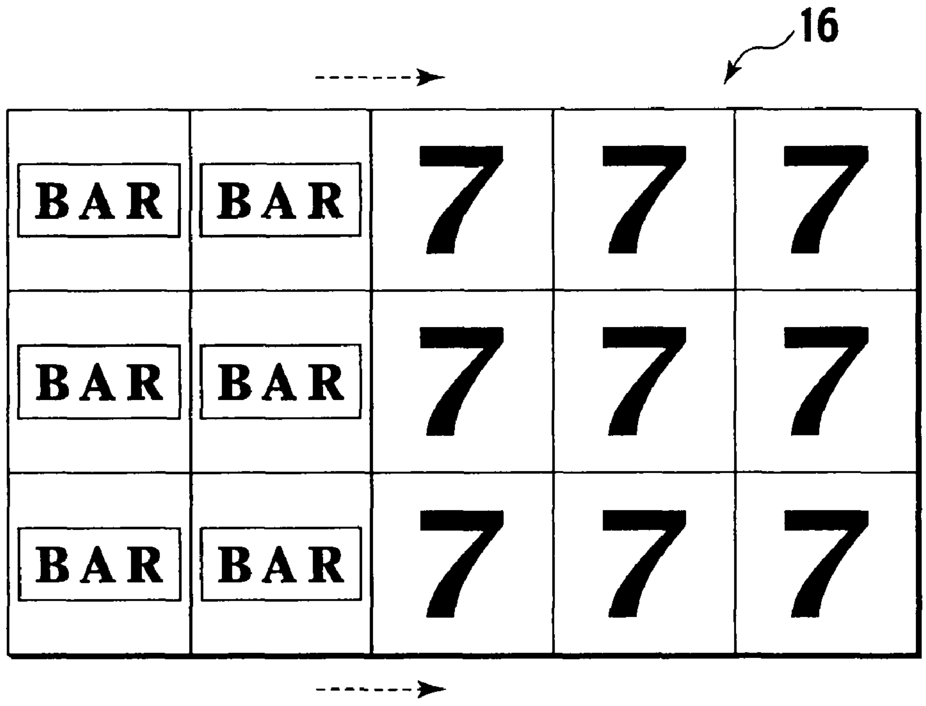
FIG. 23 is a view showing a scroll pattern of symbols on a display of a slot machine according to a modification example of the second embodiment of the present invention.
Figure 24:
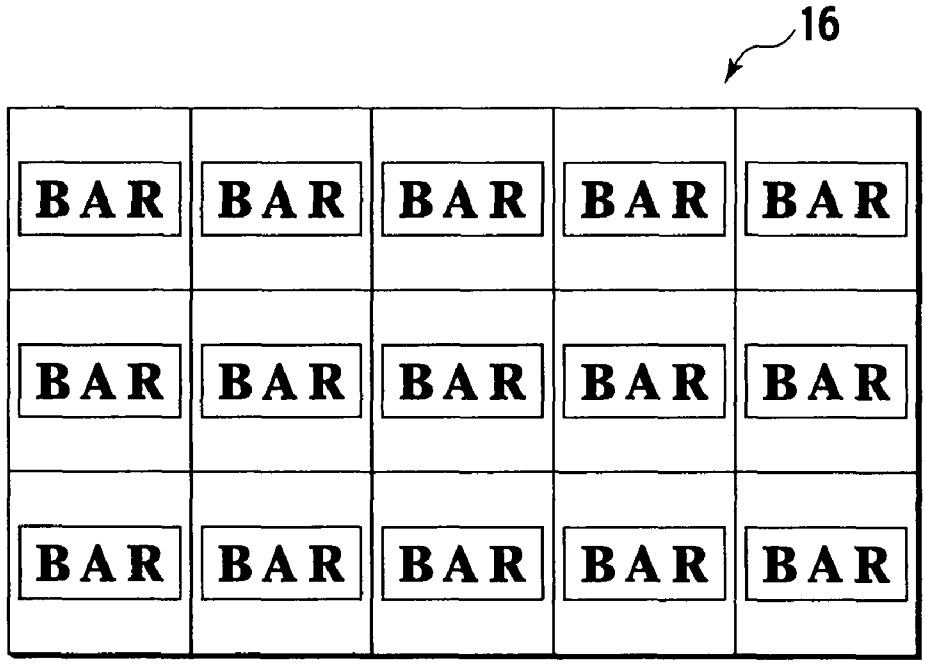
FIG. 24 is a view showing an example of symbols rearranged on the display of the slot machine according to the modification example of the second embodiment of the present invention.

In the case where the trigger symbols are rearranged as shown in FIG. 13 and FIG. 15, the display contents of symbols are linked with one another and the variable display operations of symbols are linked with one another on each column and/or each row in the range of all the defined areas q1*a* to q3*e*, as shown in FIG. 23. Then, in the case where the display contents of all the defined areas are synchronized with one another and "BAR" is rearranged, all the defined areas prescribed by the trigger symbols become "BAR" as shown in FIG. 24.

Also by the slot machine according to the modification example of the second embodiment, which is configured as described above, and by the playing method thereof, similar effects to those of the slot machine according to the second embodiment and the playing method thereof can be obtained.

The description has been made above of the embodiments of the present invention, however, the embodiments merely illustrate specific examples, and do not particularly limit the present invention, and with regard to specific configurations of the respective means and the like, design thereof is appropriately changeable. Moreover, the effects described in the embodiments of the present invention merely list the most suitable effects generated from the present invention, and the effects by the present invention are not limited to those described in the embodiments of the present invention.

Moreover, in the above-described detailed description, the description has been made mainly of characteristic portions so that the present invention can be understood more easily. The present invention is not limited to the embodiments described in the above-described detailed description, and can also be applied to other embodiments, and application ranges thereof are broad. Moreover, the terms and the phraseology, which are used in this specification, are used for accurately explaining the present invention, and are not used for limiting the interpretation of the present invention. Moreover, it is considered easy for those skilled in the art to figure out other configurations, systems, methods and the like, which are incorporated in the concept of the present invention described in this specification, from the concept concerned of the present invention. Hence, the description of the scope of claims must be regarded as one that incorporates equilibrium configurations of those of the scope of the technical concept of the present invention without departing therefrom. Moreover, it is an object of the abstract to assist patent offices, general public institutions, engineers who belong to this technical field and are not conversant in patents, law terms, or technical terms, and the like so that they can rapidly determine the technical contents and essence of this application by a simple investigation. Hence, the abstract is not intended to limit the scope of the invention to be evaluated by the description of the scope of claims. Moreover, in order to sufficiently understand the object of the present invention and the effects intrinsic to the present invention, it is desired that the present invention be interpreted in full consideration for already-disclosed documents, and the like.

The above-described detailed description incorporates processing executed by a computer. The descriptions and the expressions in the above are described for the purpose of being understood most efficiently by those skilled in the art.

In this specification, the respective steps for use in deriving one result should be understood as processing free from self-contradiction. Moreover, in the respective steps, electric or magnetic signal transmission/reception, recording, and the like are performed. In the processing in each step, such a signal is expressed by a bit, a value, a symbol, a letter, a term, a number, or the like, however, it is necessary to keep it in mind that these are merely used for explanation convenience. Moreover, the processing in each step is sometimes described in expression common to a human action, however, the processing explained in this specification is basically executed by a variety of devices. Moreover, other configurations required for performing the respective steps become self-evident from the above descriptions.

What is claimed is:

1. A slot machine comprising:

a display that displays a unit game in which a plurality of arranged symbols are rearranged individually on defined areas; and a controller programmed to execute:

(A) processing for deciding a rearrangement pattern of the symbols to be rearranged on the defined areas;

(B) processing for determining whether a trigger symbol that links display contents of symbols with one another and variable display operations of symbols with one another in a prescribed range of the defined areas exists in the rearrangement pattern decided by the processing for deciding a rearrangement pattern;

(C) processing for rearranging the trigger symbol on a defined area in a case where the trigger symbol exists; and (D) processing for setting defined areas prescribed by the trigger symbol to an enlarged defined area and rearranging one of the symbols on the enlarged defined area, after the processing for rearranging the trigger symbol on a defined area.

2. The slot machine according to claim 1, wherein the defined areas prescribed by the trigger symbol are the defined area on which the trigger symbol is rearranged and defined areas on a periphery of the defined area on which the trigger symbol is rearranged, the defined area being taken as a center.

3. The slot machine according to claim 1, wherein, in a case where a plurality of trigger symbols exist and there are defined areas overlapped in defined areas prescribed by the trigger symbols, the controller is programmed to execute the processing for setting the defined areas prescribed by the trigger symbols to the enlarged defined area and rearranging one of the symbols on the enlarged defined area.

4. The slot machine according to claim 1, wherein one of the symbols rearranged on the enlarged defined area defines that the one of the symbols is rearranged on the defined areas prescribed by the trigger symbol.

5. A slot machine, comprising:

a display that displays a unit game in which a plurality of arranged symbols are rearranged individually on defined areas; and a controller programmed to execute:

(A) processing for deciding a rearrangement pattern of the symbols to be rearranged individually on defined areas;

(B) processing for determining whether a trigger symbol that links display contents of symbols with one another and variable display operations of symbols with one another in a prescribed range of the defined areas exists in the rearrangement pattern decided by the processing for deciding a rearrangement pattern;

(C) processing for rearranging the trigger symbol on a defined area in a case where the trigger symbol exists; and (D) processing for linking the display contents of symbols with one another and the variable display operations of symbols with one another on each column and/or each row in a range of defined areas prescribed by the trigger symbol after the processing for rearranging the trigger symbol on the defined area, wherein the defined areas prescribed by the trigger symbol are the defined area on which the trigger symbol is rearranged and defined areas on a periphery of the defined area on which the trigger symbol is rearranged, the defined area being taken as a center.

6. A slot machine, comprising:

a display that displays a unit game in which a plurality of arranged symbols are rearranged individually on defined areas; and a controller programmed to execute:

(A) processing for deciding a rearrangement pattern of the symbols to be rearranged individually on defined areas;

(B) processing for determining whether a trigger symbol that links display contents of symbols with one another and variable display operations of symbols with one another in a prescribed range of the defined areas exists in the rearrangement pattern decided by the processing for deciding a rearrangement pattern;

(C) processing for rearranging the trigger symbol on a defined area in a case where the trigger symbol exists; and (D) processing for linking the display contents of symbols with one another and the variable display operations of symbols with one another on each column and/or each row in a range of defined areas prescribed by the trigger symbol after the processing for rearranging the trigger symbol on the defined area, wherein, in a case where a plurality of trigger symbols exist and there are defined areas overlapped in defined areas prescribed by the trigger symbols, the controller is programmed to execute the processing for linking the display contents of symbols with one another and the variable display operations of symbols with one another on each column and/or each row in the range of the defined areas prescribed by the trigger symbols.

7. A slot machine comprising:

a display that displays a unit game in which a plurality of arranged symbols are rearranged individually on defined areas; and a controller programmed to execute:

(A) processing for rearranging a trigger symbol on a defined area;

(B) processing for setting the defined area on which the trigger symbol is rearranged and defined areas on a periphery of the defined area on which the trigger symbol is rearranged, the defined area being taken as a center, to an enlarged defined area on which one of the symbols is rearranged; and (C) processing for scrolling symbols on the enlarged defined area in a scroll direction different from a usual scroll direction.

8. The slot machine according to claim 7, wherein the controller is programmed to execute the processing for laterally scrolling the symbols on the enlarged defined area.

9. The slot machine according to claim 7, wherein one of the symbols rearranged on the enlarged defined area defines that the one of the symbols is rearranged on the defined area on which the trigger symbol is rearranged and the defined areas on the periphery of the defined area on which the trigger symbol is rearranged, the defined area being taken as the center.

10. A slot machine comprising:

a display that displays a unit game in which a plurality of arranged symbols are rearranged individually on defined areas; and a controller programmed to execute:

(A) processing for rearranging a trigger symbol on a defined area;

(B) processing for scrolling symbols on the defined area on which the trigger symbol is rearranged and defined areas on a periphery of the defined area on which the trigger symbol is rearranged, the defined area being taken as a center, in a scroll direction different from a usual scroll direction; and (C) processing, in a case where a predetermined number of the same symbols are rearranged on the defined areas, for generating an award that is based on the number of the same symbols.

11. The slot machine according to claim 10, wherein the controller is programmed to execute the processing for scrolling the symbols in the scroll direction while linking display contents of symbols on the defined area on which the trigger symbol is rearranged and the defined areas on the periphery of the defined area on which the trigger symbol is rearranged, the defined area being taken as the center.

12. The slot machine according to claim 10, wherein the controller is programmed to execute the processing for laterally scrolling the symbols.

13. A control method of a slot machine comprising:

(A) deciding a rearrangement pattern of symbols to be rearranged on defined areas;

(B) determining whether a trigger symbol that links display contents of symbols with one another and variable display operations of symbols with one another in a prescribed range of the defined areas exists in the rearrangement pattern decided by the processing for deciding a rearrangement pattern;

(C) rearranging the trigger symbol on a defined area in a case where the trigger symbol exists; and (D) after processing for rearranging the trigger symbol on the defined area, setting defined areas prescribed by the trigger symbol to an enlarged defined area and rearranging one of the symbols on the enlarged defined area.

14. The control method of a slot machine according to claim 13, wherein the defined areas prescribed by the trigger symbol are the defined area on which the trigger symbol is rearranged and defined areas on a periphery of the defined area on which the trigger symbol is rearranged, the defined area being taken as a center.

15. The control method of a slot machine according to claim 13, wherein, in a case where a plurality of trigger symbols exist and there are defined areas overlapped in the defined areas prescribed by the trigger symbols are provided, the defined areas prescribed by the trigger symbols are set to the enlarged defined area and one of the symbols is rearranged on the enlarged defined area.

16. The control method of a slot machine according to claim 13, wherein one of the symbols rearranged on the enlarged defined area defines that the one of the symbols is rearranged on the defined areas prescribed by the trigger symbol.

17. A control method of a slot machine, comprising:

(A) deciding a rearrangement pattern of symbols to be rearranged on defined areas;

(B) determining whether a trigger symbol that links display contents of symbols with one another and variable display operations of symbols with one another in a prescribed range of the defined areas exists in the rearrangement pattern decided by the processing for deciding a rearrangement pattern;

(C) rearranging the trigger symbol on a defined area in a case where the trigger symbol exists; and (D) linking the display contents of symbols with one another and the variable display operations of symbols with one another on each column and/or each row in a range of defined areas prescribed by the trigger symbol after rearranging the trigger symbol on the defined area, wherein the defined areas prescribed by the trigger symbol are the defined area on which the trigger symbol is rearranged and defined areas on a periphery of the defined area on which the trigger symbol is rearranged, the defined area being taken as a center.

18. A control method of a slot machine, comprising:

(A) deciding a rearrangement pattern of the symbols to be rearranged individually on defined areas;

(B) determining whether a trigger symbol that links display contents of symbols with one another and variable display operations of symbols with one another in a prescribed range of the defined areas exists in the rearrangement pattern decided by the processing for deciding a rearrangement pattern;

(C) rearranging the trigger symbol on a defined area in a case where the trigger symbol exists; and (D) linking the display contents of symbols with one another and the variable display operations of symbols with one another on each column and/or each row in a range of defined areas prescribed by the trigger symbol after rearranging the trigger symbol on the defined area, wherein, in a case where a plurality of trigger symbols exist and there are defined areas overlapped in defined areas prescribed by the trigger symbols, the display contents of symbols are linked with one another and the variable display operations of symbols are linked with one another on each column and/or each row in the range of the defined areas prescribed by the trigger symbols.

19. A control method of a slot machine comprising:

(A) rearranging a trigger symbol on a defined area;

(B) setting the defined area on which the trigger symbol is rearranged and defined areas on a periphery of the defined area on which the trigger symbol is rearranged, the defined area being taken as a center, to an enlarged defined area on which one of the symbols is rearranged; and (C) scrolling symbols on the enlarged defined area in a scroll direction different from a usual scroll direction.

20. The control method of a slot machine according to claim 19, wherein the symbols are laterally scrolled on the enlarged defined area.

21. The control method of a slot machine according to claim 19, wherein one of the symbols rearranged on the enlarged defined area defines that the one of the symbols is rearranged on the defined area on which the trigger symbol is rearranged and the defined areas on the periphery of the defined area on which the trigger symbol is rearranged, the defined area being taken as the center.

22. A control method of a slot machine comprising:

(A) rearranging a trigger symbol on a defined area;

(B) scrolling symbols on the defined area on which the trigger symbol is rearranged and defined areas on a periphery of the defined area on which the trigger symbol is rearranged, the defined area being taken as a center, in a scroll direction different from a usual scroll direction; and (C) in a case where a predetermined number of the same symbols are rearranged on the defined areas, generating an award that is based on the number of the same symbols.

23. The control method of a slot machine according to claim 22, wherein display contents of symbols are linked on the defined area on which the trigger symbol is rearranged and the defined areas on the periphery of the defined area on which the trigger symbol is rearranged, the defined area being taken as the center.

24. The control method of a slot machine according to claim 22, wherein the symbols are laterally scrolled.

* * * * *